United States Patent [19]
Yamada et al.

[11] Patent Number: 5,561,289
[45] Date of Patent: Oct. 1, 1996

[54] DEVICE FOR DETECTING LINE OF SIGHT

[75] Inventors: Akira Yamada, Yokohama; Akihiko Nagano, Ichihara, both of Japan

[73] Assignee: Canon Kabushiki Kaisha, Tokyo, Japan

[21] Appl. No.: 519,753

[22] Filed: Aug. 28, 1995

Related U.S. Application Data

[63] Continuation of Ser. No. 142,089, Oct. 28, 1993, abandoned.

[30] Foreign Application Priority Data

Oct. 29, 1992 [JP] Japan .................................. 4-291504

[51] Int. Cl.$^6$ ........................................................ G01J 1/20
[52] U.S. Cl. ................ 250/221; 250/201.2; 250/201.6; 250/201.7; 250/559.29
[58] Field of Search .......................... 250/201.2, 201.4, 250/201.6, 201.7, 201.8, 221, 561

[56] References Cited

U.S. PATENT DOCUMENTS

| | | | |
|---|---|---|---|
| 5,006,700 | 4/1991 | Kosaka et al. ........................ | 250/201.4 |
| 5,182,443 | 1/1993 | Suda et al. ........................... | 250/201.2 |
| 5,245,371 | 9/1993 | Nagano et al. ...................... | 354/62 |

FOREIGN PATENT DOCUMENTS

| | | |
|---|---|---|
| 1-274736 | 11/1989 | Japan . |
| 2-213322 | 8/1990 | Japan . |
| 4-157435 | 5/1992 | Japan . |

*Primary Examiner*—Anita Pellman Gross
*Assistant Examiner*—Fetsum Abraham
*Attorney, Agent, or Firm*—Fitzpatrick, Cella, Harper & Scinto

[57] ABSTRACT

In a device for detecting the line of sight of the observer, when the detection of the line of sight is identified as having failed, the detection is effected again with a variation in the output signal of the eyeball image or in the detection threshold value for detecting the feature points of the reflected image, thereby improving the precision and the rate of success of the detection of the line of sight. The variation in the image output signal is achieve by (1) a variation in the charge accumulating time, (2) a variation in the amplification characteristics of the image sensor, (3) a variation in the current of the illuminating infrared light-emitting diodes, and/or (4) a variation in the positions of the illuminating infrared light-emitting diodes.

106 Claims, 17 Drawing Sheets

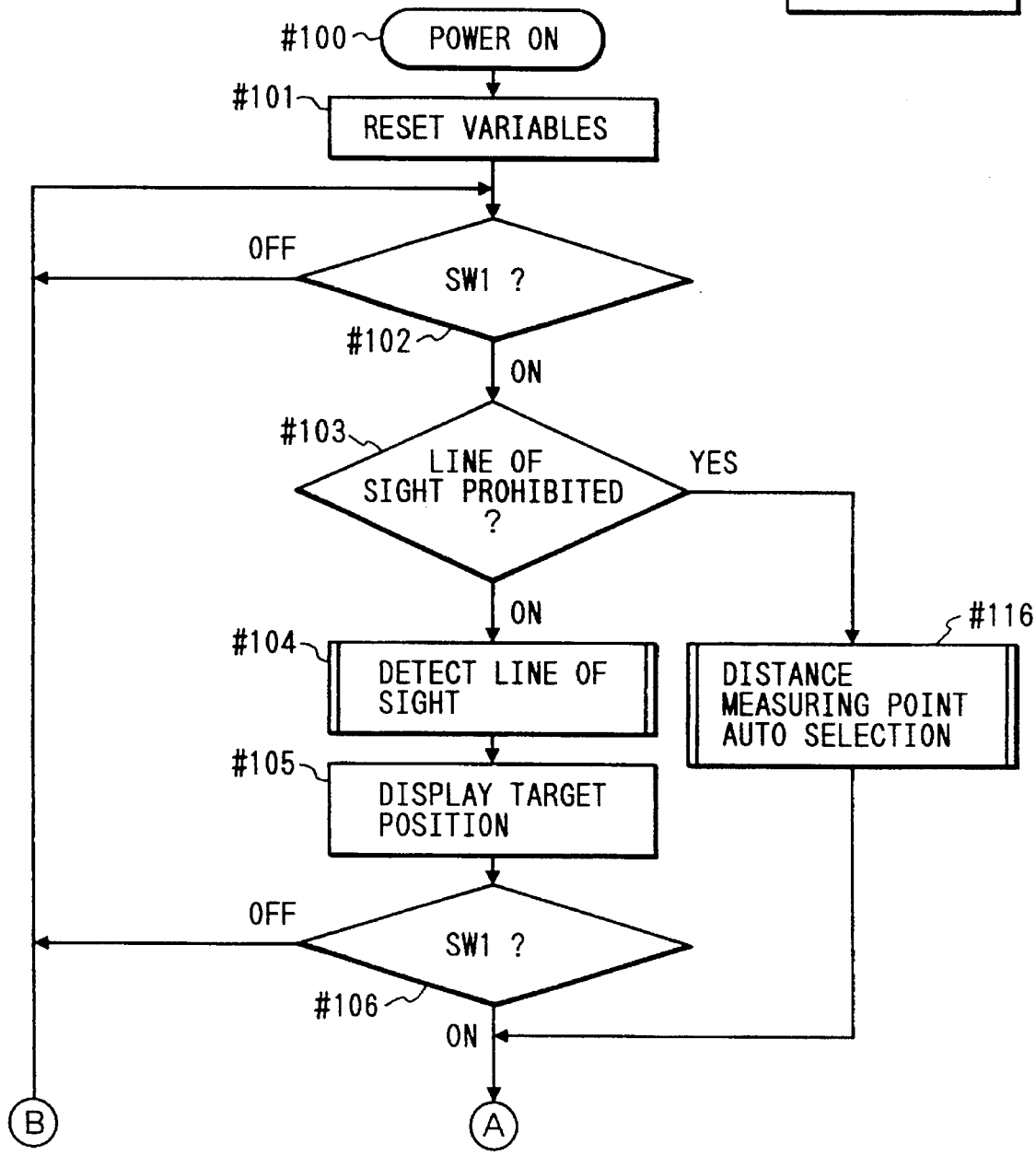

FIG. 9

| AGC TABLE | LUMINANCE OF EYEBALLS Be | ACCUMULATION TIME ms | GAIN | CHARACTERISTIC |
|---|---|---|---|---|
| 1 | LESS THAN 1 | 20 | ×10 | NON LINEAR |
| 2 | 1 ~ 2 | 15 | ×10 | NON LINEAR |
| 3 | 2 ~ 4 | 10 | ×10 | NON LINEAR |
| 4 | 4 ~ 8 | 14 | ×5 | NON LINEAR |
| 5 | 8 ~ 12 | 10 | ×5 | NON LINEAR |
| 6 | 12 ~ 18 | 6 | ×5 | LINEAR |
| 7 | 18 ~ 27 | 8 | ×2.5 | LINEAR |
| 8 | MORE THAN 27 | 5 | ×2.5 | LINEAR |

DEVICE FOR DETECTING LINE OF SIGHT

This application is a continuation of application Ser. No. 08/142,089 filed Oct. 28, 1993, abandoned.

BACKGROUND OF THE INVENTION

1. Field of the Invention

The present invention relates to a device for detecting the line of sight of the observer, utilizing an image of the eyeball thereof.

2. Related Background Art

There have been proposed various devices for detecting the position in the viewing field, observed by the observer, or so-called line of sight thereof, such as the eye camera.

For example, the Japanese Patent Laid-Open Application No. 1-274736 discloses a device for projecting a parallel light beam from a light source to the frontal part of the eyeball of the observer, and determining the line of sight by means of the corneal reflected image and the image position of the pupil, formed by the light reflected from the cornea.

FIG. 17 shows the principle of detection of the line of sight, and FIGS. 18A and 18B are respectively a view showing the image of eyeball projected onto an image sensor shown in FIG. 17 and a chart showing output intensity from the image sensor 14.

In the following there will be given an explanation on the method of detecting the line of sight, making reference to FIGS. 17, 18A and 18B. Infrared light-emitting diodes 13a, 13b are positioned substantially symmetrically with respect to the optical axis (i) of a light-receiving lens 12, or to the Z-axis, and respectively illuminate the eyeball of the observer in a diffuse manner.

The infrared light emitted from the LED 13b illuminates the cornea 16 of the eyeball 15. A corneal reflected image d, formed by a part of the infrared light reflected at the surface of the cornea 16, is refocused by the light-receiving lens 12 at a position d' on an image sensor 14.

Similarly the infrared light emitted from the LED 13a illuminates the cornea 16 of the eyeball. A corneal reflected image e, formed by a part of the infrared light reflected at the surface of the cornea 16 is refocused by the light-receiving lens 12 at a position e' on the image sensor 14.

Also the light beams from end positions a, b of the iris 17 are condensed by the light-receiving lens 12 to form images of said end positions a, b at positions a', b' on the image sensor 14. When the rotation angle $\theta$ of the optical axis (ii) of the eyeball 15 is small with respect to the optical axis (i) of the light-receiving lens 12, the coordinate Xc of the center of the pupil 19 can be represented by the coordinates xa, xb of said end positions a, b of the iris 17 as follows:

$$Xc=(Xa+Xb)/2.$$

Also, since the Z-coordinate of the center of the corneal reflected images d, e coincides with the Z-coordinate Zo of the center O of curvature of the cornea 16, the rotation angle $\theta$ of the optical axis (ii) of the eyeball approximately satisfies a relation:

$$(A1 * L_{OC}) * \sin\theta \cong Xc-(Xd+Xe)/2 \quad (1)$$

wherein Xd, Xe are X-coordinates of the positions d, e where the corneal reflected images are generated, $L_{OC}$ is a standard distance from the center O of curvature of the cornea 16 to the center C of the pupil 19, and A1 is a coefficient representing individual fluctuation on said distance $L_{OC}$. Consequently, in a sight line calculating device, the rotation angle $\theta$ of the optical axis (ii) of the eyeball can be determined by detecting the positions of feature points (corneal reflected images d, e and end positions a, b of the iris) projected on the image sensor, as shown in FIGS. 18A and 18B. In this operation, the equation (1) is re-written as:

$$\beta(A1 * L_{OC}) * \sin\theta \cong (Xa'+Xb')/2 - (Xd'+Xe')/2 \quad (2)$$

wherein $\beta$ stands for a magnification determined by the position of the eyeball with respect to the light-receiving lens 12, and is practically determined as a function of the distance |Xd'Xe'| of the corneal reflected images. Also the rotation angle $\theta$ of the eyeball 15 is re-written as:

$$\theta \cong \arcsin\{(Xc'-Xf')/\beta/(A1 * L_{OC})\} \quad (3)$$

wherein $$Xc' \cong (Xa'+Xb')/2$$

$$Xf' \cong (Xd'+Xe')/2.$$

Since the optical axis (ii) of the eyeball of the observer does not coincide with the line of sight, the horizontal line of sight $\theta H$ of the observer can be determined by an angular correction $\delta$ between the optical axis of the eyeball and the line of sight, once the rotation angle $\theta$ of the optical axis (ii) of the eyeball in the horizontal direction is calculated. Taking a coefficient B1 for the individual fluctuation for the correction angle $\delta$ between the optical axis (ii) of the eyeball and the line of sight, the line of sight $\theta H$ of the observer in the horizontal direction can be given by:

$$\theta H = \theta \pm (B1 * \delta) \quad (4)$$

wherein the sign $\pm$ is + or − respectively if the observer looks at the device with the left eye or the right eye, when the rotation angle to the right with respect to the observer is taken as positive.

FIG. 17 shows a case of the rotation of the eyeball of the observer in the Z-X plane (for example horizontal plane), but the detection is similarly possible also in case of rotation of the eyeball in the Z-Y plane (for example vertical plane). However, since the vertical component of the line of sight of the observer coincides with the vertical component $\theta'$ of the optical axis of the eyeball, the line of sight $\theta V$ in the vertical direction is represented by:

$$\theta V = \theta'.$$

Based on the sight line data $\theta H$, $\theta V$, the coordinates (Xn, Yn) looked at by the observer on the focus screen in a view finder field is given by:

$$\begin{aligned} Xn &= m * \theta H \\ &= m * [\arcsin\{(Xc' - Xf')/\beta/(A1 * L_{OC})\} \pm \\ &\quad (B1 * \delta)] \\ Yn &= m * \theta V \end{aligned} \quad (5)$$

wherein m is a constant determined by the finder optical system of the camera.

The coefficients A1, B1 for correcting the individual fluctuation of the eyeball of the observer can be determined by letting the observer watch an index provided in a predetermined position in the view finder and matching the position of the watched point calculated according to the equation (5) with the position of said index.

The calculation for determining the line of sight of the observer and the watched point is executed by the software of a microcomputer of the sight line processing device, according to the foregoing equations.

Since the coefficient for correcting the individual difference in the line of sight generally corresponds to the horizontal rotation of the eyeball of the observer, the two indexes provided in the view finder are positioned in the horizontal direction to the observer.

After the determination of said coefficient for correcting the individual difference in the line of sight, the position, on the focusing screen, of the line of sight of the observer looking at the view finder is calculated according to the equation (5), and thus obtained information on the line of sight is utilized for focusing control of the phototaking lens or for exposure control.

For detecting the corneal reflected image (Purkinje's image) or the ends of the pupil, it is necessary that an image signal of the eyeball image can be obtained in constantly stable manner. For this purpose there is usually adopted automatic gain control, but, in case of a sight line detecting device often used outdoors, such as the one incorporated in the camera, the signal level of the eyeball image is considerably unstable by the external noises. Thus, even under the application of automatic gain control, there have been encountered drawbacks of erroneous detection of the corneal reflected image (hereinafter called Purkinje's image) as an external ghost, or of deficient output level at the ends of the pupil, rendering the sight line detection impossible or generating a significant error in the detection. Also since the Purkinje's image and the end portions of the pupil are strongly affected by the state of external light or by the position of the eye-ball of the observer, an algorithm enabling constant detection will give excessive burden to the microcomputer, and, in fact, it has been extremely difficult to prepare such an algorithm.

The present applicant already proposed, in the Japanese Patent Laid-Open Application No. 2-213322, in forming a Purkinje's image by projecting a parallel light beam onto the eyeball, to alter the projecting direction of said parallel light beam if the Purkinje's image overlaps with the pupil edge image.

SUMMARY OF THE INVENTION

The object of the present invention is to provide a highly reliable device for detecting the line of sight, comprising detection means for detecting the line of sight utilizing the image of the eyeball of the observer, wherein, if proper detection of the line of sight is identified not possible, said detection of the line of sight is conducted again by said detection means with a change in the detection method.

BRIEF DESCRIPTION OF THE DRAWINGS

FIG. 9 is an AGC table;

DETAILED DESCRIPTION OF THE PREFERRED EMBODIMENTS

Figure 1:
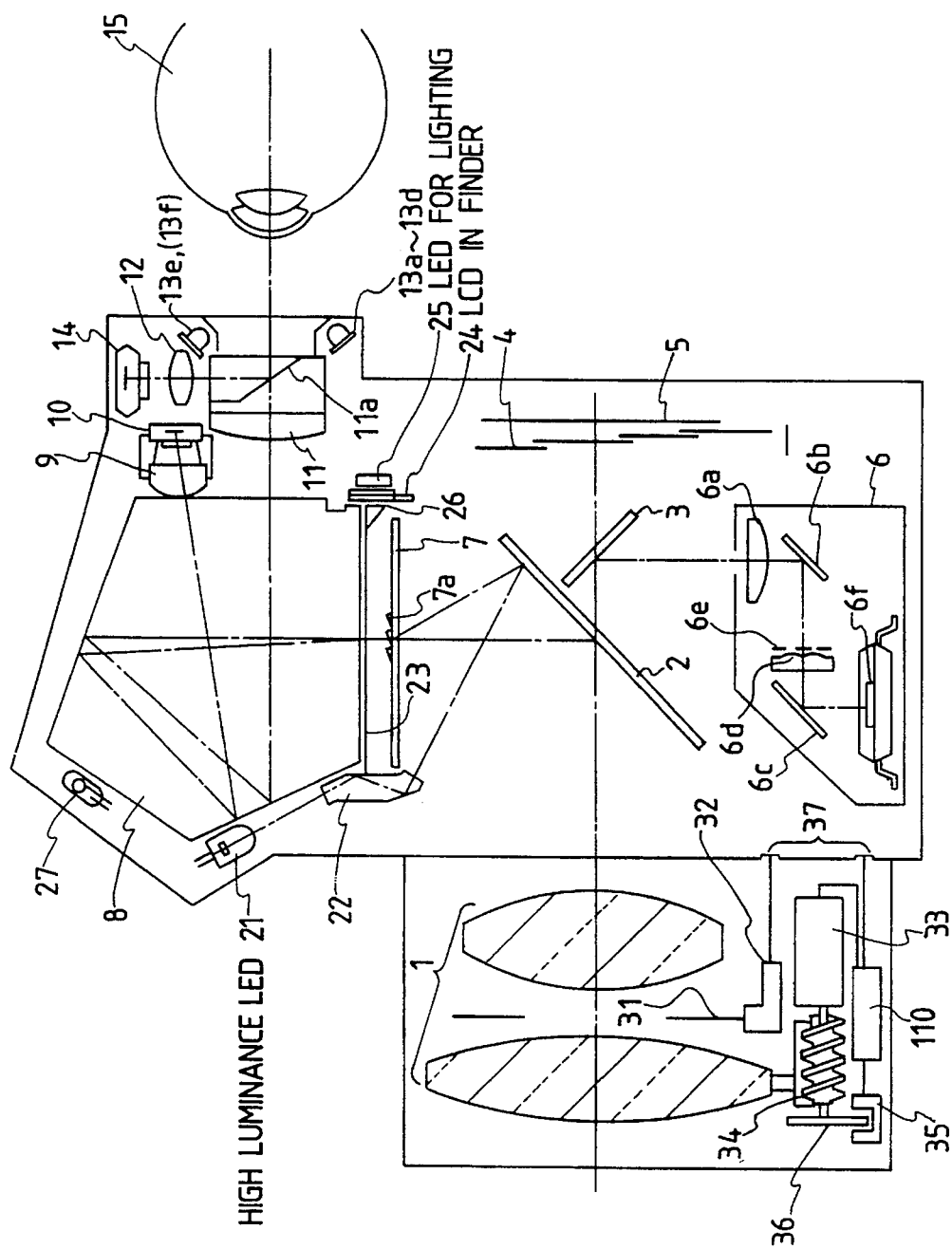
FIG. 1 is a schematic view of a single lens reflex camera.
Figure 2:
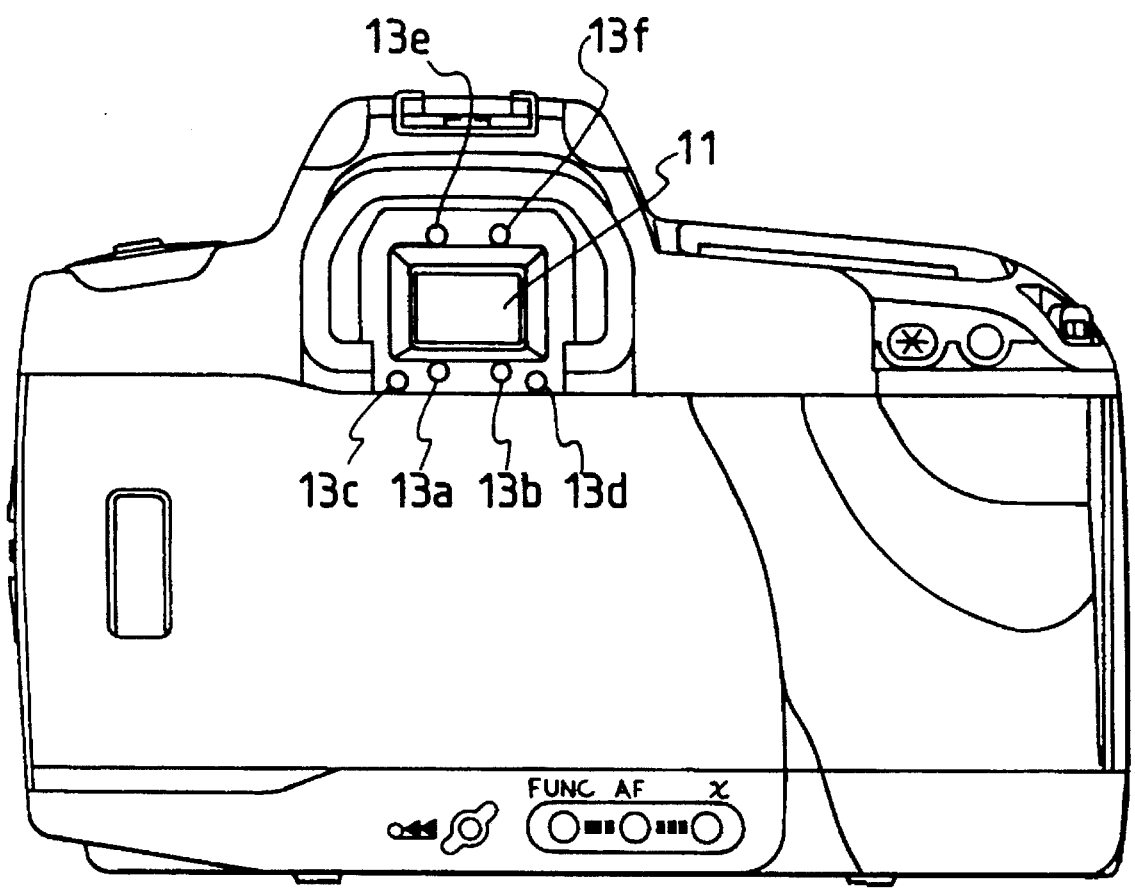
FIG. 2 is a schematic rear view of the single lens reflex camera.
Figure 3:
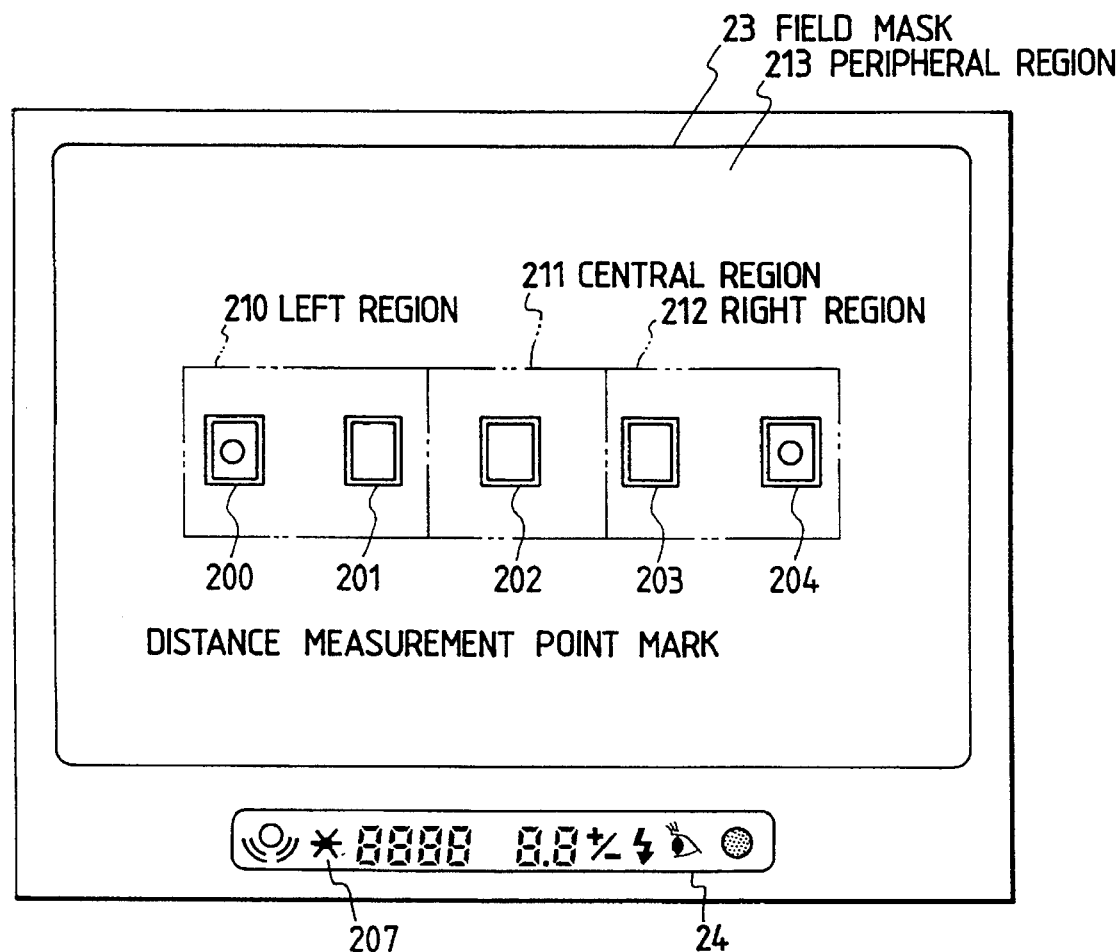
FIG. 3 is a view showing the viewing field of the view finder.

FIG. 1 is a schematic view of a first embodiment of the present invention, applied to a single reflex camera, FIG. 2 is a schematic rear view of said camera, and FIG. 3 is a schematic view of the viewing field of the view finder shown in FIG. 1.

Referring to these drawings, there is shown a phototaking lens 1, illustrated with two lenses for the purpose of simplicity but in practice composed of a larger number of lenses; a main mirror 2 positioned obliquely in the phototaking optical path (mirror down state) or retracted therefrom (mirror up state) or respectively in a state for observing the object image by the finder system or in a state of phototaking; a sub mirror 3 for reflecting the light beam, transmitted by the main mirror 2, downwards toward a focus state detecting device 6 positioned in the lower part of the camera body; a shutter 4; a photosensitive member 5 composed of a silver halide-based film, a solid-state image pickup device such as a CCD or a MOS sensor, or an image pickup tube; and a focus state detecting device 6 composed of a field lens 6a positioned close to the focal plane, mirrors 6b, 6c, a secondary imaging lens 6d, a diaphragm 6e and plural CCD line sensors 6f.

The focus state detecting device 6 of the present embodiment employs the known phase difference method, and is so designed as to detect the focus state in plural (five) distance measuring areas (focus detection points) within the viewing field as shown in FIG. 3.

There are further provided a focusing screen 7 positioned at the estimated focal plane of the phototaking lens 1; a pentagonal roof-shaped prism 8 for deflecting the finder optical path; and an imaging lens 9 and a photosensor 10 for measuring the object luminance in the viewing field. The focusing screen 7 and the photosensor 10 are rendered mutually conjugate with respect to the imaging lens 9, through the optical path reflected by the pentagonal roof-shaped prism 8.

Behind the exit face of said pentagonal prism 8, there is provided an eyepiece lens 11 provided with a light splitter 11a, for observation of the focusing screen 7 by the eye 15 of the photographer. Said light splitter 11a is composed, for example, of a dichroic mirror transmitting the visible light and reflecting the infrared light.

There are further provided a light receiving lens 12; an image sensor 14 composed of two-dimensionally arranged photosensor arrays such as CCD, and so positioned as to be conjugate approximately with the pupil of the eye 15 of the photographer in a predetermined position, with respect to said light receiving lens 12; and infrared light-emitting diodes 13a–13f constituting light sources and positioned around the eyepiece lens 11 as shown in FIG. 2.

There is also provided a superimposing LED 21 of high luminance, observable even among highly bright objects, and light emitted therefrom is guided through a projecting prism 22, then reflected by the main mirror 2, deflected perpendicularly by a microprism array 7a provided in a display area of the focusing screen 7, further guided through the pentagonal prism 8 and the eyepiece lens 11 and reaches the eye 15 of the photographer.

Said microprism arrays 7a are formed as frames in five positions corresponding to the focus detecting areas of the focusing screen 7, and said frames are respectively illuminated by five superimposing LED's 21 (LED-L1, LED-L2, LED-C, LED-R1, LED-R2).

Thus, in the finder viewing field shown in FIG. 3, the distance measuring marks 200, 201, 202, 203, 204 emit light, thereby indicating the focus detecting areas (distance measuring points). Such lighting will hereinafter be called superimposed display.

A viewing field mask 23 is provided for defining the finder viewing field. A liquid crystal display (LCD) 24 is provided for displaying phototaking information, in an area outside the finder viewing field, and is illuminated by an LED 25.

The light transmitted by the LCD 24 is guided by a triangular prism 26 into the finder viewing field and provides a display 207 outside the viewing field of the finder as shown in FIG. 3, whereby the photographer can recognize the phototaking information. A known mercury switch 27 is provided for detecting the camera position.

There are further provided a diaphragm 31 provided within the phototaking lens 1; a diaphragm drive device 32 including a diaphragm drive circuit 111 to be explained later; a lens driving motor 33; a lens driving member 34 composed for example of a driving gear; a photocoupler 35 for detecting the rotation of a pulse disk 36 linked with the lens driving member 34 and transmitting the obtained information to a lens focusing circuit 110, which drives the lens driving motor based on said information and the information on the lens drive amount transmitted from the camera body, thereby moving the phototaking lens 1 to the in-focus position; and a known lens mount contact 37 constituting an interface between the camera and the phototaking lens.

Figure 4:
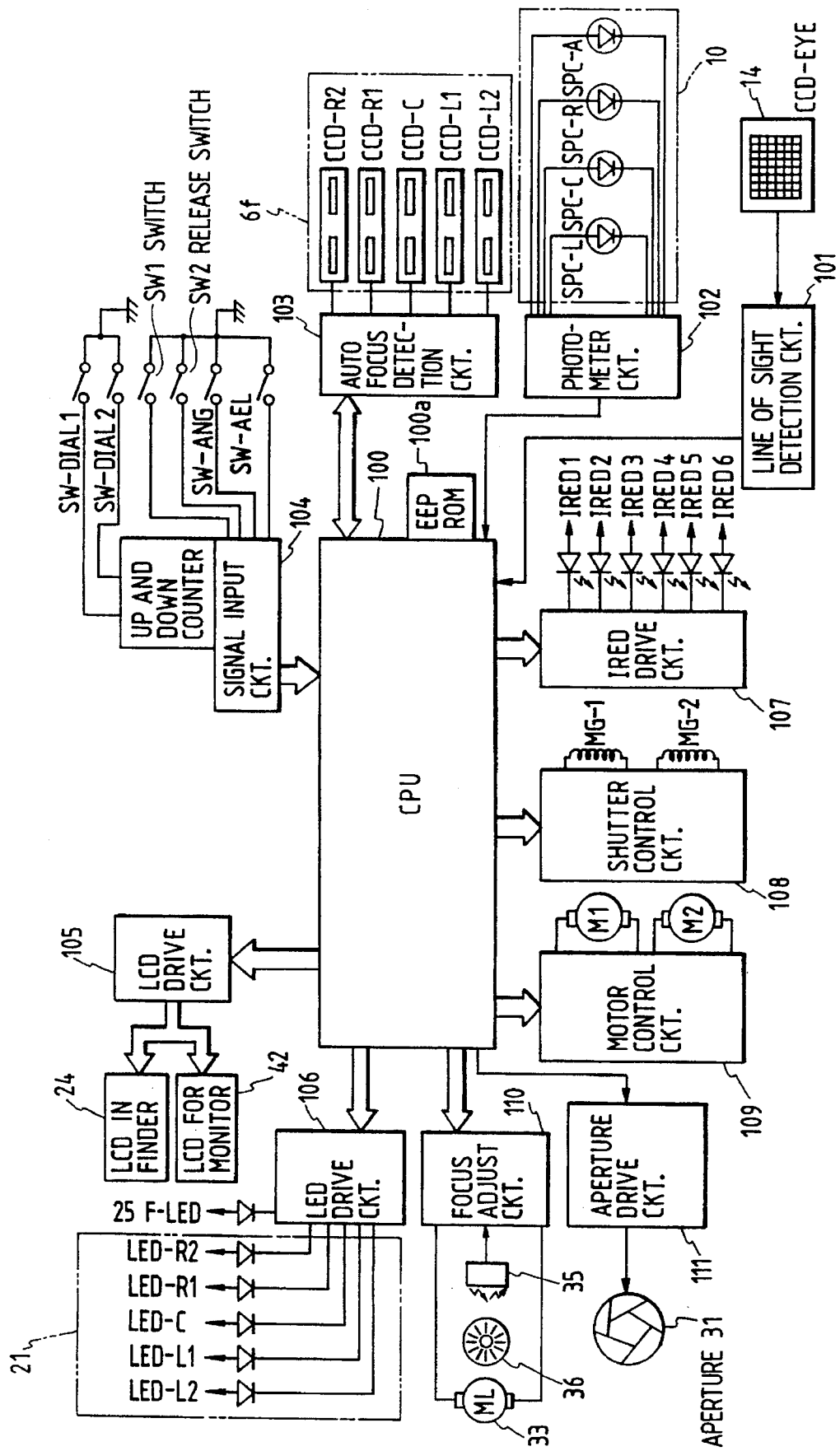
FIG. 4 is a circuit diagram of the camera.
Figure 5B:
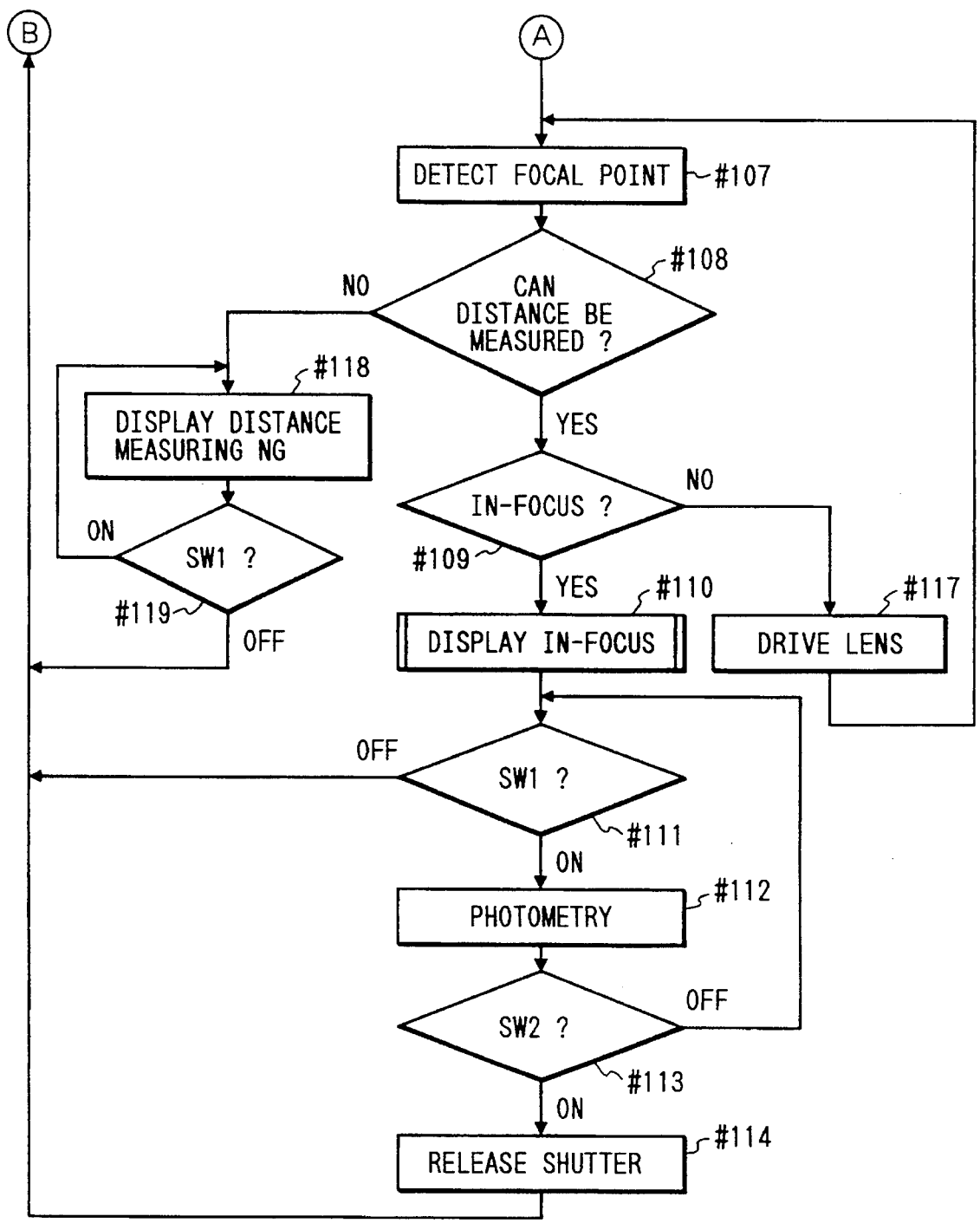
FIG. 5, which consists of FIGS. 5A and 5B, are flowcharts showing the control sequence of a camera equipped with a sight line detecting device.

FIG. 4 is a circuit diagram of the electric circuit incorporated in the camera, wherein same components as those in FIG. 1 are represented by same numbers.

A central processing unit (CPU) 100 of a microcomputer incorporated in the camera body is connected to a sight line detecting circuit 101, a light metering circuit 102, an auto focus detection circuit 103, a signal input circuit 104, an LCD drive circuit 105, an LED drive circuit 106, an IRED drive circuit 107, a shutter control circuit 108 and a motor control circuit 109. It also effects signal exchange with a focusing circuit 110 and a diaphragm drive circuit 111 provided in the phototaking lens, through mount contacts 37 shown in FIG. 1.

An EEPROM 100a, attached to the CPU 100, serves as a memory for storing the correction data for correcting the individual difference in the line of sight.

The sight line detecting circuit 101 effects A/D conversion on the output of the eyeball image from the image sensor (signal accumulating photosensor; CCD-EYE) 14 and transmits the obtained image information to the CPU 100, which extracts the feature points of the eye image, required for the detection of the line of sight, according to a predetermined algorithm, and calculates the line of sight of the photographer, based on the positions of said feature points.

The light metering circuit 102 effects amplification, logarithmic compression and A/D conversion on the outputs of photosensors 10, and transmits the obtained luminance information of each sensor to the CPU 100. Said photosensors 10 are composed of four photodiodes for measuring the luminance of four areas, namely a photodiode SPC-L for measuring a left area 210 including the left-hand distance measuring points 200, 201 in the viewing field, a photodiode SPC-C for measuring a central area 211 including the central distance measuring point 202, a photodiode SPC-R for measuring a right area 212 including the right-hand distance measuring points 203, 204, and a photodiode SPC-A for measuring a peripheral area 213.

The line sensor 6f shown in FIG. 4 is composed of five CCD line sensors CCD-L2, CCD-L1, CCD-C, CCD-R1 and CCD-R2 respectively corresponding to five distance measuring points 200–204 in the viewing field shown in FIG. 3.

The automatic focus detecting circuit 103 effects A/D conversion of the voltages obtained from said line sensor 6f for transfer to the CPU 100. There are also provided a switch SW-1 to be turned on by a first stroke of a shutter release button thereby initiating light metering, auto focusing, sight line detection etc., a release switch SW-2 to be turned on by a second stroke of the shutter release button, a position detection switch SW-ANG controlled by the mercury switch 27, an AE lock switch SW-AEL to be turned on by the depression of an AE locking button, and dial switches SW-DIAL1, SW-DIAL2 provided in an unrepresented electronic dial and connected to an up-down counter of the signal input circuit 104, for detecting the amount of rotation of said electronic dial.

The known LCD drive circuit 105, for driving the liquid crystal display unit LCD, provides displays simultaneously on the monitor LCD 42 and the finder LCD 24, of the diaphragm value, shutter speed, selected phototaking mode etc. according to signals from the CPU 100. The LED drive circuit 106 controls the lighting of the illuminating LED's 25 and the superimposing LED's 21. The IRED drive circuit 107 selectively turns on the infrared LED 13a–13f.

The shutter control circuit 108 controls a solenoid MG-1 for releasing the leading shutter curtain and a solenoid MG-2 for releasing the trailing shutter curtain, thereby exposing the photosensitive member to a predetermined amount of light. The motor control circuit 109 serves to control a motor M1 for advancing and rewinding the photographic film, and a motor M2 for moving the main mirror 2 and charging the shutter 4. A shutter release sequence is executed by said shutter control circuit 108 and said motor control circuit 109.

In the following there will be explained the function of the camera equipped with the sight line detecting device, with reference to the attached flow charts.

When the camera is shifted from the inactive state to a predetermined phototaking mode (in the following description there will be explained the case of the shutter preferential auto exposure (AE) mode) by the rotation of an unrepresented mode dial, the power supply of the camera is turned on (#100), and the variables used for the detection of the line of sight in the CPU 100 are reset (#101).

Then the camera waits until the switch SW1 is turned on by the depression of the shutter release button (#102), When the signal input circuit 104 detects that said switch SW1 is turned on by the depression of the shutter release button, the CPU 100 confirms the state of the sight line detecting circuit 101 (#103).

If the sight line inhibition mode is selected in this state, a distance measuring point is selected by a distance measuring point auto selection subroutine (#116), without execution of the sight line detection, namely without utilizing the sight line information. Then the auto focus detecting circuit 103 executes the focus detection at said distance measuring point (#107).

For such automatic selection of the distance measuring point, there can be considered several algorithms, but advantageously employed is the near point-preferential algorithm with weighting on the central distance measuring point. The content of such algorithm will not be explained further since it is not directly related to the present invention.

On the other hand, if the sight line detection mode is selected, there is executed the detection of the line of sight (#104).

The line of sight detected by the sight line detecting circuit 101 is converted into the coordinates of the watched point on the focusing screen 7. The CPU 100 selects a distance measuring point close to said coordinates, and sends a signal to the LED drive circuit 106 to cause a superimposing LED 21 to intermittently flash the mark of said distance measuring point (#105).

If the photographer, upon seeing the display of the selected distance measuring point, recognizes that said distance measuring point is improper and turns off the switch SW1 by lifting finger from the shutter release button (#106), the camera waits until the switch SW1 is again turned on (#102).

As the distance measuring point selected by the sight line information is informed to the photographer by intermittent flashing of the distance measuring point mark in the viewing field of the view finder, the photographer can confirm whether the point is selected matching his intention.

On the other hand, if the photographer, upon seeing the display of the distance measuring point selected according to the sight line information, continues to turn on the switch SW1 (#106), the auto focus detecting circuit 103 executes the focus detection for at least one distance measuring point, utilizing the detected sight line information (#107).

Then there is discriminated whether the distance measurement is possible at the selected distance measuring point (#108), and, if not possible, the CPU 100 sends a signal to the LCD drive circuit 105 to cause the in-focus mark in the finder LCD 24 to intermittently flash, thereby informing the photographer of a warning that the distance measurement is impossible (#118) until the switch SW1 is turned off (#119).

If the distance measurement is possible and if the focus state of the distance measuring point selected according to the predetermined algorithm is not in-focus (#109), the CPU 100 sends a signal to the lens focusing circuit 110 thereby driving the phototaking lens 1 by a predetermined amount (#117). After said lens drive, the auto focus detecting circuit 103 effects the focus detection again (#107), thereby discriminating whether the phototaking lens 1 is in the in-focus state (#109).

If the phototaking lens 1 is in focus at the predetermined distance measuring point, the CPU 100 sends a signal to the LCD drive circuit 105 to turn on the in-focus mark of the finder LCD 24, and sends a signal to the LED drive circuit 106 to effect the in-focus display on the distance measuring point 201 in the in-focus state (#110).

In this state the intermittent flashing of the distance measuring point selected by the line of sight is turned off, but, since said distance measuring point often coincides with the distance measuring point of the in-focus display, the latter is turned on continuously in order to inform the photographer of the in-focus state. If the photographer, seeing the display of the in-focus state of the distance measuring point in the view finder, recognizes that said distance measuring point is improper and turns off the switch SW1 by lifting the finger from the shutter release button (#111), the camera waits until the switch SW1 is turned on again (#102).

On the other hand, if the photographer, upon seeing the display of the in-focus distance measuring point in the view finder, continues to turn on the switch SW1 (#111), the CPU 100 sends a signal to the light metering circuit 102 to effect the light metering (#112). In this state, the exposure value is calculated, utilizing the light metering areas 210–213 including the in-focus distance measuring point.

In the present embodiment, there is executed known light metering calculation with weighting on the light metering area 210 including the distance measuring point 201.

Then there is discriminated whether the switch SW2 is turned on by a further depression of the shutter release button (#113), and, if it is off, there is again confirmed the state of the switch SW1 (#111). On the other hand, if the switch SW2 is turned on, the CPU 100 sends signals to the shutter control circuit 108, motor control circuit 109 and diaphragm drive circuit 111.

At first the motor M2 is activated to lift the main mirror 2 and to close the diaphragm 31, then the solenoid MG1 is energized to release the leading curtain of the shutter 4 thereby initiating the exposure. The aperture value of the diaphragm 31 and the speed of the shutter 4 are determined from the exposure value detected by the light metering circuit 102 and the sensitivity of the film 5. After the lapse of a predetermined shutter time (for example ½50 sec.), the solenoid MG2 is energized to release the trailing curtain of the shutter 4, thereby terminating the exposure. Upon completion of exposure of the film 5, the motor M2 is activated again to lower the mirror and to charge the shutter. At the same time, the motor M1 is also activated to advance the film by a frame, whereby the serial operations of the shutter release sequence are terminated (#114). Thereafter the camera waits until the switch SW1 is turned on again (#102).

Figure 6:
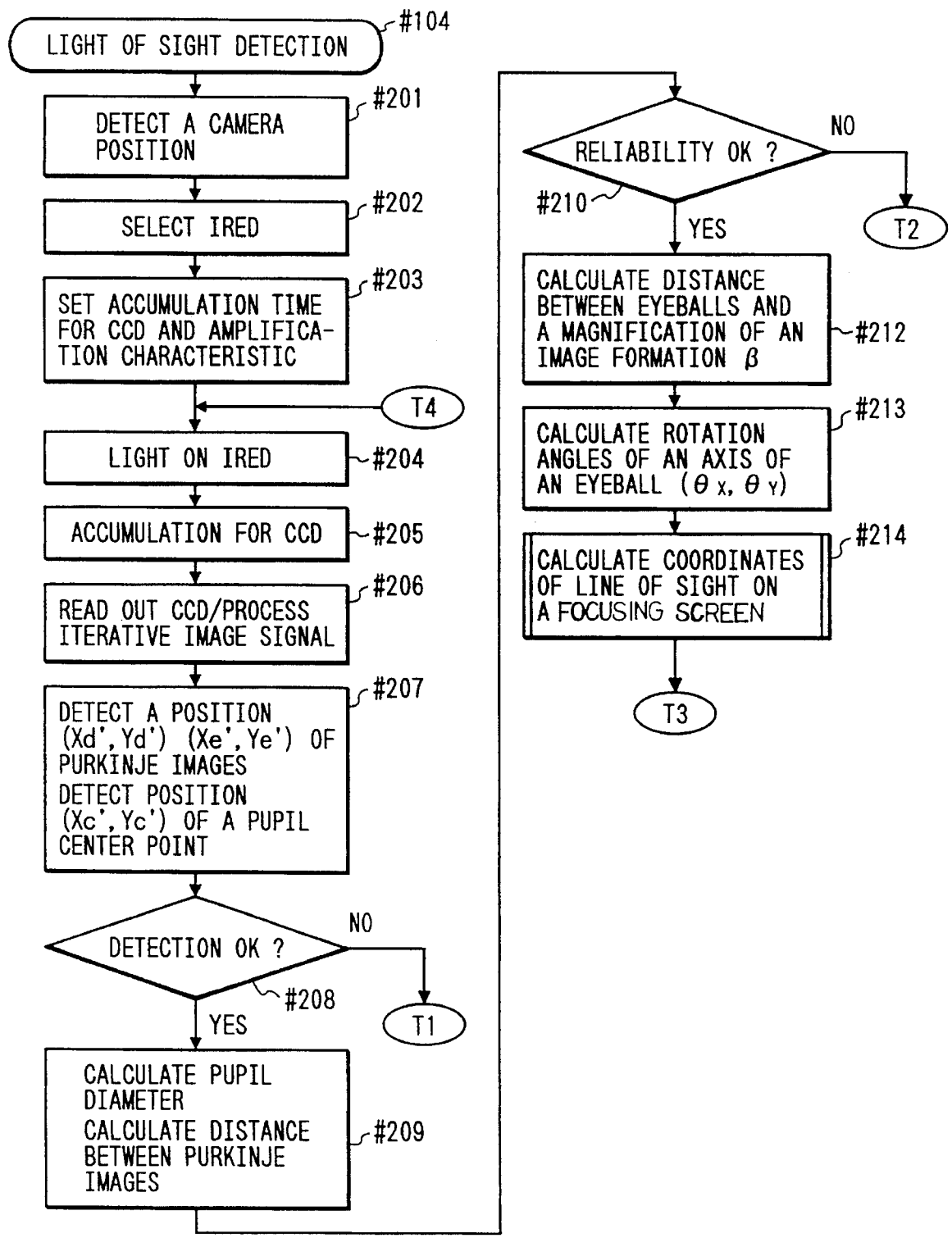
FIG. 6 is a flowchart showing the sequence of detection of the line of sight.

FIG. 6 is a flowchart of the detection of the line of sight. As explained in the foregoing, in response to a signal from the CPU 100, the sight line detecting circuit 101 executes the detection of the line of sight (#104).

In case of detection of the line of sight in a phototaking mode, the sight line detecting circuit 101 at first detects the position of the camera, by means of the signal input circuit 104 (#201). By processing the output signal of the mercury switch 27 (SW-ANG), the signal input circuit 104 discriminates whether the camera is in the horizontal or vertical position, and, in case of vertical position, whether the shutter release button is at the upper side or at the ground side.

Then, based on the information on thus detected camera position and on the eyeglass information of the photographer contained in the calibration data, there are selected the infrared light-emitting diodes (IRED) 13a–13f (#202). If the camera is held in the horizontal position and if the photographer does not wear the eyeglasses, there are selected the IRED's 13a, 13b close to the optical axis of the view finder, shown in FIG. 2.

On the other hand, if the camera is held in the horizontal position and if the photographer wears eyeglasses, there are selected the IRED's 13c, 13d distant from the optical axis of the view finder. In this state, a part of the illuminating light reflected by the eyeglass is directed outside a predetermined area of the image sensor 14 where the eyeball image is projected, so that the analysis of said eyeball image is not hindered.

Also if the camera is held in the vertical position, there is selected a combination of the IRED's 13a and 13e, or 13b and 13f, so as to illuminate the eyeball of the photographer from below.

Then, based on the luminance information of the eyeball, there are set the charge accumulation time of the image sensor (CCD-EYE) 14 and the amplification characteristics for the sensor output (#203). In order to determine the luminance information of the eyeball, the eyeball image is divided into plural areas, and said luminance value is calculated from the luminance values in thus divided areas. The operations in this step #203 will be explained further in the following.

Figure 7:
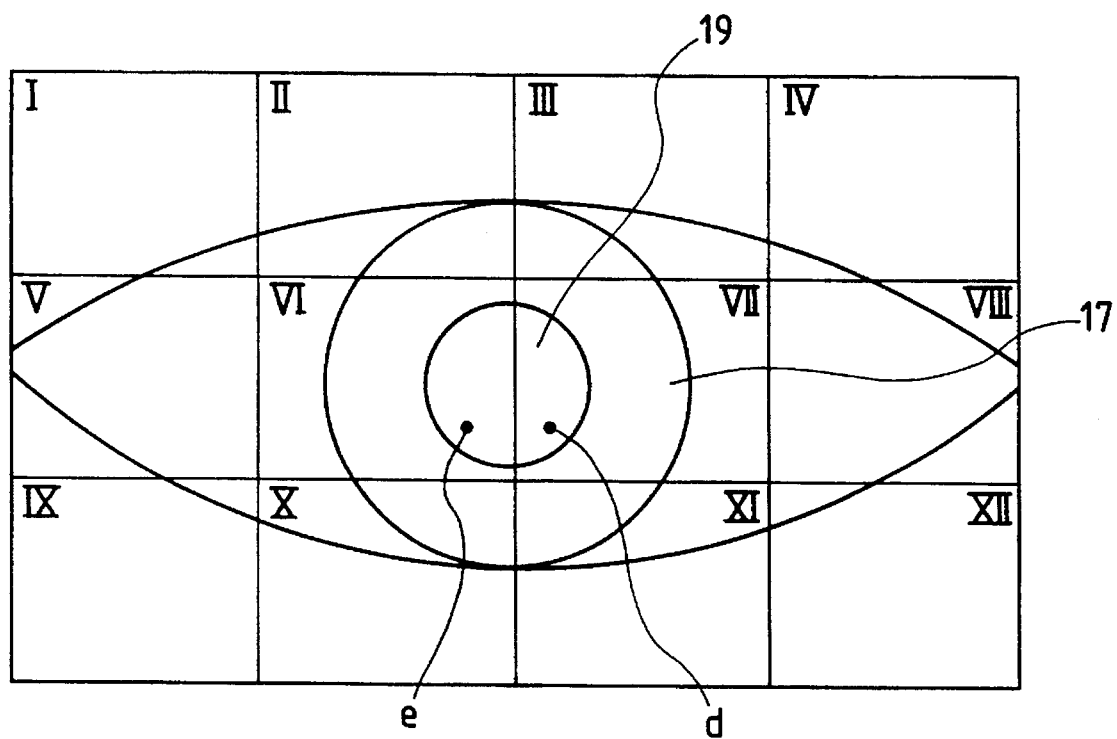
FIG. 7 is a schematic view of an eyeball image shown together with detection areas.

FIG. 7 shows an eyeball image in twelve divided detection areas, wherein the areas VI, VII constituting a central area A are assumed to have luminances A1, A2; the areas II, III, X, XI constituting intermediate areas B above and below said central area A are assumed to have luminances B1, B2, B3, B4; and the areas I, IV, V, VIII, IX, XII constituting lateral peripheral areas C are assumed to have luminances C1, C2, C3, C4, C5, C6.

Figure 8:
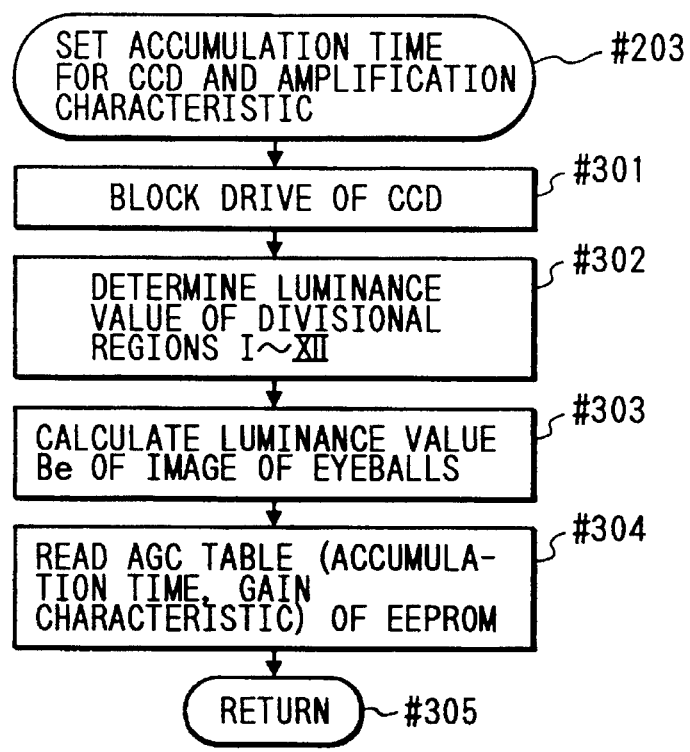
FIG. 8 is a flowchart showing the sequence of setting charge accumulation time and amplification characteristics.

FIG. 8 is a flowchart showing the details of the step #203 in FIG. 6. At first said CCD-EYE 14 is driven in blocks (#301), by dividing the photosensor of said CCD-EYE 14 into 12 areas and effecting the charge accumulation, transfer and readout in each divided block, and the luminance is determined in each of thus divided blocks (#302).

FIG. 9 shows an AGC table stored in the EEPROM 100a of the CPU 100 and indicating the set values of the charge accumulation time and the amplification characteristics. Then based on the luminance values of the detection areas I–XII, the luminance value Be of the eyeball image is calculated according to a predetermined algorithm (#303), then one of the AGC tables 1 to 8 is selected according to said Be value, and the charge accumulation time, the amplification rate and the amplification characteristics corresponding to thus selected AGC table are fetched (#304). After said data setting, the sequence returns (#305). The CPU 100 effects the charge accumulation of the CCD-EYE 14 and the amplification of the sensor output according to the fetched values, thereby releasing an image signal enabling detection of the Purkinje's image and the feature points of the pupil, required for detection of the line of sight.

In the following there will be explained the linear and non-linear amplifications, in the amplification characteristics shown in the AGC tables 1–8. As the Purkinje's image appears, by its nature, as a bright point of a very high light intensity, the sensor output is significantly different between the iris and the Purkinje's image in case of phototaking in an indoor or sunshade situation where the influence of external light is limited, so that the sensor output of the Purkinje's image may be saturated. Also, since the output of the Purkinje's image is significantly variable, it is often difficult to simultaneously detect the iris part and the Purkinje's image with a same output level.

Figure 10:
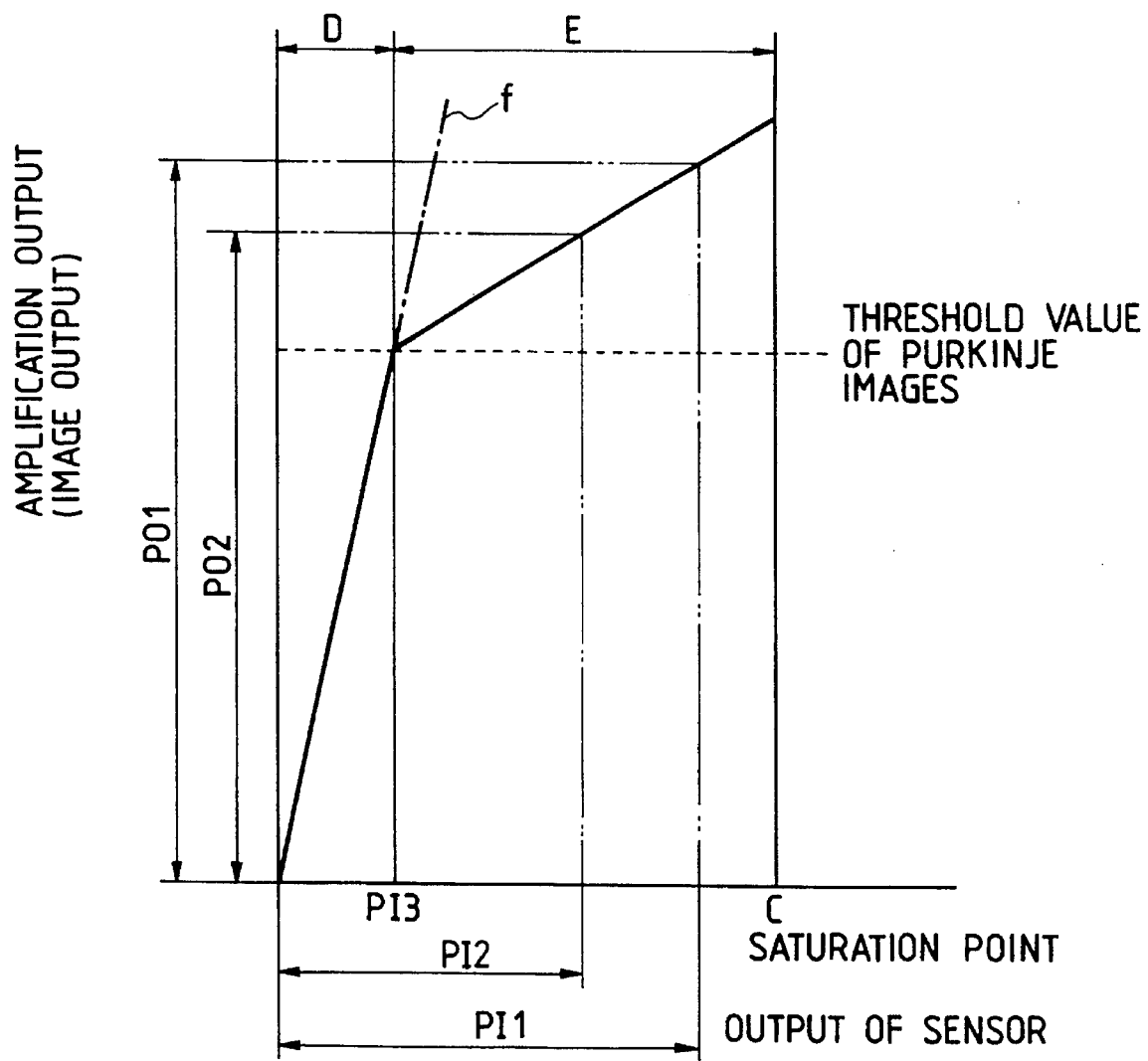
FIG. 10 is a chart showing amplification characteristics for the output of the image sensor.

FIG. 10 is a chart showing the amplification characteristics for the output of the image sensor, and the above-mentioned drawback can be prevented by utilizing non-linear amplification for the sensor output and setting the threshold value for detecting the Purkinje's image, for thus amplified image signal, at a point where the variation of the amplification rate is large.

More specifically, as shown in FIG. 10, the amplification factor is selected larger, for example 10 to 20 times, in an area D where the sensor output is small, and smaller, for example 1 to 2 times, in an area E where the sensor output is large. In this manner, in response to a variation of the image sensor output from PI1 to PI2, the detected image output only varies from PO1 to PO2. Stated differently, in response to a variation in the ratio PI2/PI1, the image output only varies in a smaller ratio PO2/PO1. Also by positioning the detection threshold value for the Purkinje's image around the transition point between the areas E and D, there can be obtained an image output signal with little fluctuation as long as the sensor output of said Purkinje's image is at least equal to PI3, so that the Purkinje's image can be detected in stable manner. A chain line f represents linear characteristics without the above-mentioned transition point, with a constant amplification factor.

The AGC tables 1–8 are featured by a fact that the charge accumulation time, the amplification factor (Gain) and the amplification characteristics are always determined as a combined set, whereby the number of the AGC tables can be reduced. In FIG. 9, in cases where the amplification characteristics are non-linear, there is indicated the gain in the area D.

In the above-mentioned non-linear characteristics, it is switched to linear above a certain eyeball luminance Be (above 12 in this embodiment). When the eyeball image luminance becomes considerably high, with a short charge accumulation time and a low gain, the relative ratio of the output signal of the Purkinje's image to that of the iris becomes smaller, in comparison with the situation where the eyeball image is darker. In order to compensate such situation, the linear characteristics are adopted to increase the image output signal of the Purkinje's image in relative manner, thereby facilitating the detection.

Figure 11:
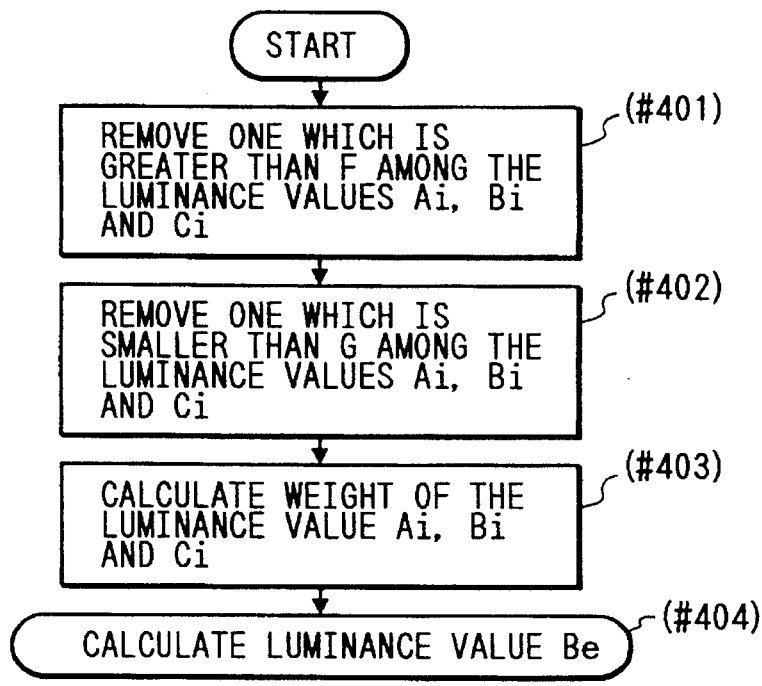
FIG. 11 is a flowchart showing an algorithm for determining the luminance of eyeball.

In the following there will be explained an algorithm for determining the luminance Be of the eyeball image, based on the luminance values of the divided areas I–XII (#303), with reference to FIG. 11. At first, among the luminances A1, A2, B1, B2, B3, B4, C1, C2, C3, C4, C5 and C6, those of extremely high values are estimated as ghost caused by the external light, and are excluded if they exceed a threshold value F (#401). Also those of extremely low values are estimated as areas of dark indoor without the eye (areas without the image) and are excluded if they are lower than a threshold value G (#402).

The view finder is easiest to look at when the pupil is positioned at the approximate center thereof. Consequently, as shown in FIG. 7, the iris is generally positioned in the central area A of the detection area, and partially present in the intermediate area B. In the present embodiment, therefore, for an average luminance Ai of the area A, an average luminance Bi of the area B and an average luminance Ci of the area C, excluding the luminance values excluded in the steps #401 and #402, the eyeball luminance is given by the following weighted equation, with a largest weighting in the central area A, a less weighting in the intermediate area B and are least weighting in the peripheral area C (#403):

$$Be=(Ai\times 3+Bi\times 2+Ci\times 1)/6 \qquad (6).$$

The luminance of the eyeball image is determined, and the algorithm of the step #303 is thus terminated (#404). In the foregoing steps #401 and #402 the luminances larger than the threshold value F or smaller than the threshold value G are excluded, but it is also possible to replace said luminances with the threshold values F, G instead of said exclusion.

In this manner the luminance of the eyeball image around the iris part can be detected without error by the external noises.

Now, referring again to FIG. 6, when the charge accumulation time of the CCD-EYE and the amplification characteristics for the sensor output are set, the CPU 100 turns on the IRED with a predetermined power through the IRED drive circuit 107 (#204) and the sight line detecting circuit 101 initiates the charge accumulation of the CCD-EYE (#205).

The CCD-EYE terminates the charge accumulation according to the accumulation time set above, and the IRED is simultaneously turned off.

The CPU 100 reads the eyeball image of the photographer from the CCD-EYE after the charge accumulation and extracts the features of the corneal reflected image and the pupil in successive manner (#206).

Figure 18A:
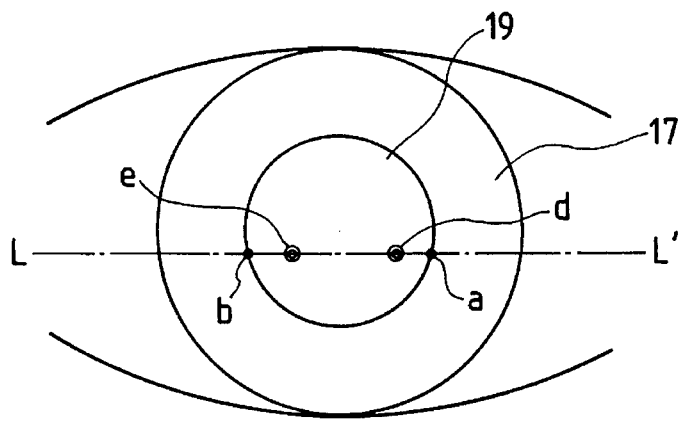
FIGS. 18A and 18B are respectively a view of an eyeball image and a chart showing the output of the image sensor.
Figure 18B:
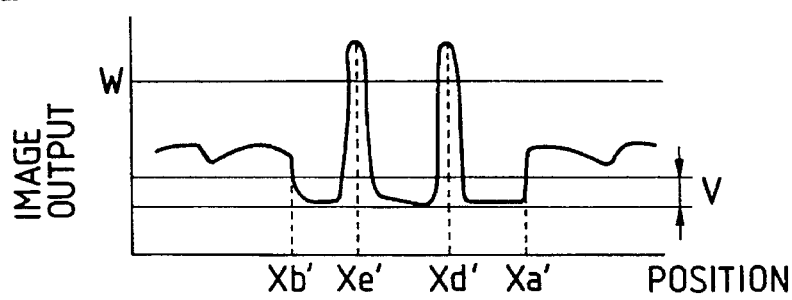

Since the Purkinje's image appears as a bright point of a high intensity, the candidates for the true Purkinje's image can be extracted as the luminances exceeding a certain threshold value in the light intensity. More specifically, as shown in FIG. 18B, the image output signals exceeding the threshold value W for the Purkinje's image are extracted, and the position of the center of Gravity of such extracted points is determined. Also plural boundary points between the pupil 19 and the iris 17 are extracted. This can be achieved by extracting points satisfying a detection algorithm that, as shown in FIG. 18B, the image output signal in the iris 17 does not exceed the aforementioned threshold value W and the output difference at the boundary of the pupil 19 and the iris 17 is at least equal to a threshold value V.

After the extraction of the feature points of the pupil and the Purkinje's image, there are detected, based on these information, the positions of a set of Purkinje's images and the position of the pupil center (#207). Thus there are detected the coordinates (Xd', Yd'), (Xe', Ye') of the Purkinje's images, which are false images of a set of IRED's positioned substantially on a line of the CCD-EYE. Also the position (Xc', Yc') of the pupil center can be detected by a minimum square approximation of a circle, based on the extracted boundary points.

Then there is discriminated whether the Purkinje's image and the position of the pupil center have been detected (#208). If said detection has failed, it becomes clear at this point that the detection of the line of sight has failed.

Figure 12:
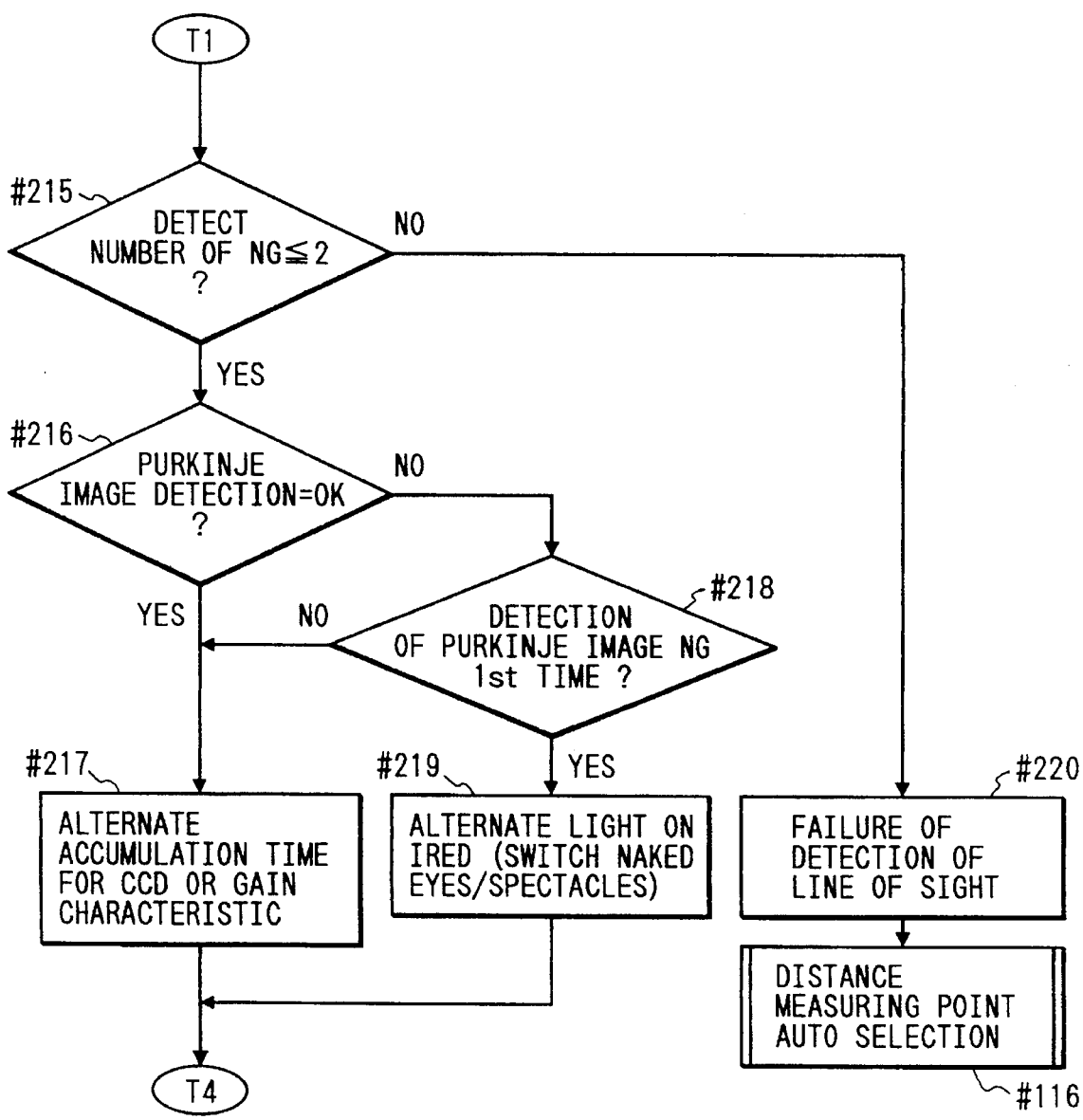
FIGS. 12 to 14 are flowcharts of sight line detection indicating an algorithm when the detection of the line of sight has failed.

When the detection fails, the sequence proceeds to a step #215 in the flow chart shown in FIG. 12, and, if said failure is for the 1st or 2nd time, there is discriminated whether the failure is in the detection of the Purkinje's image (#216). If the Purkinje's image has been successfully detected, the failure is in the detection of the center of the pupil. The failure in the detection of the pupil center usually results from an insufficient difference in the output levels of the pupil and the iris, smaller than the threshold value V. Then the sequence proceeds to a step #217 for varying the charge accumulation time of the CCD-EYE or the amplification characteristics of the sensor output, thereby increasing the output level of the iris. More specifically, there is reset an AGC table positioned upper than the table previously selected as explained in the step #203, or the charge accumulation time or the gain is reset with multiplication of a certain factor on the previously set value. After said resetting, the sequence returns to the step #204 to turn on the IRED's and to effect the detection of the line of sight again. On the other hand, if the step #216 identifies that the failure was based in the detection of the Purkinje's image, the sequence proceeds to a step #218 for discriminating whether the failure was the 1st or 2nd time. If it was the 1st time, the sequence proceeds to a step #219. The failure in the detection of the Purkinje's image may result from a situation that a ghost image generated by external light is superposed on the Purkinje's image, or a situation that the eyeball is too close to or too far from the activated IRED's. In such cases the positions of the IRED's constituting the light sources are changed. In such situations it is effective to effect illumination from different positions, by varying the activated IRED's. More specifically, if the IRED's 13a, 13b for the bare eye are turned on previously, they are switched to those 13c, 13d for the eye with eyeglass, or vice versa (#219). Then the sequence returns to the step #204 to effect the detection of the line of sight with thus switched IRED's. On the other hand, if the step #218 identifies that the failure was 2nd time, which is after the above-mentioned switching of the IRED's, the sequence proceeds to a step #217 for varying the charge—accumulation time of the CCD or the amplification characteristics as in the case of failure in the detection of the pupil center. Also as will be apparent from the flow chart, if the detection of the pupil center fails again after the variation in the charge accumulation time or in the amplification characteristics, the step #217 is executed once again, and, in this case it is effective to select an AGC table positioned lower than the previously selected one or to reduce the charge accumulation time or the amplification gain from the previously selected value. If the step #215 identifies that the detection of the line of sight already failed three times, the detection is regarded to have failed (#220) so that the distance measuring point cannot be selected by the line of sight, and there is executed the distance measuring point auto selecting subroutine without the sight line information (#116).

In case the step #208 identifies that the Purkinje's image and the pupil center have been successfully detected, there are calculated the pupil diameter $r_p$ and the distance of two Purkinje's images from the positions thereof (#209). Then there is discriminated the reliability of thus calculated Purkinje's image and pupil center, based on the size of the pupil diameter, the distance of the Purkinje's images and whether the detected position is within a predetermined area (#210).

Figure 13:
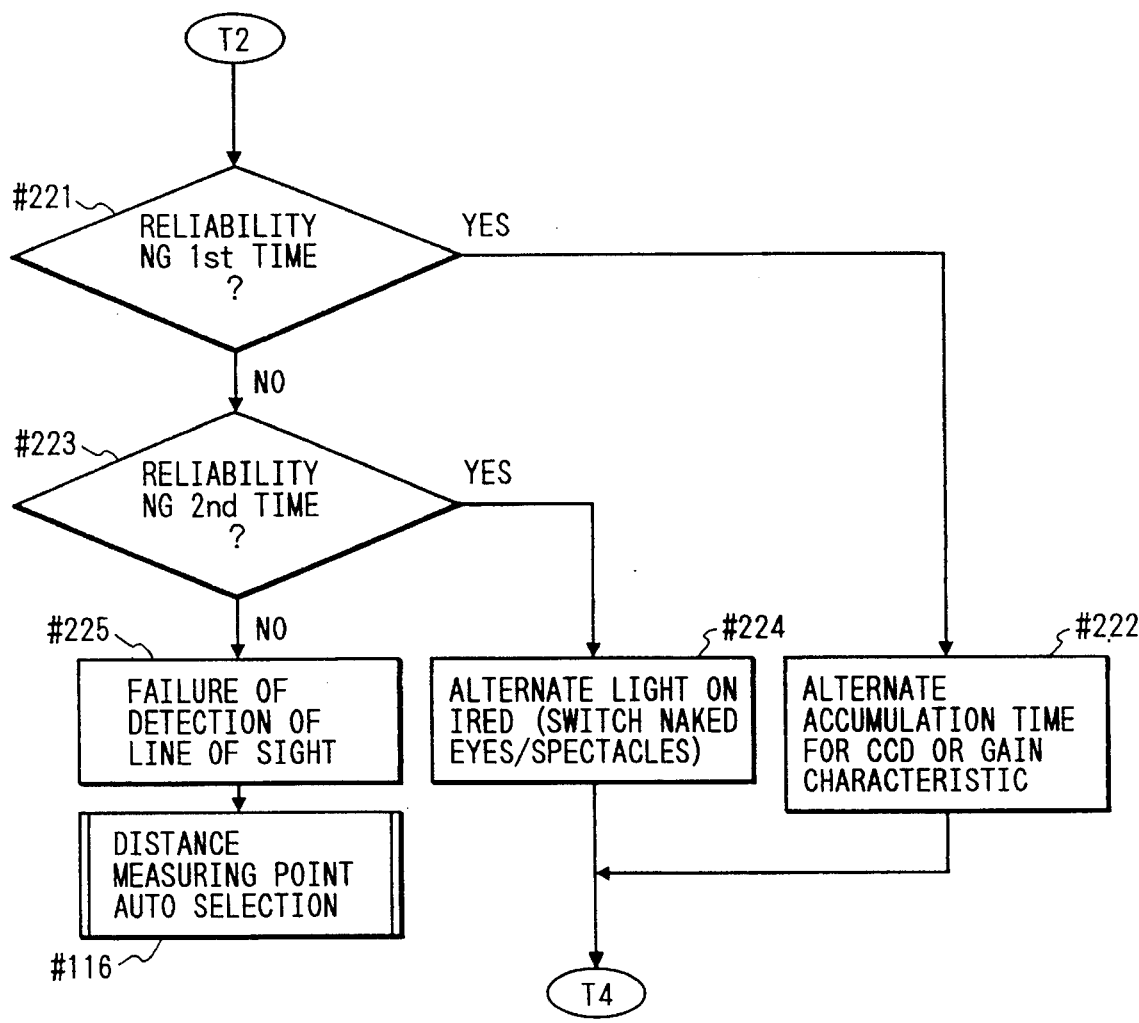

If the reliability is identified not good, the sequence proceeds to a step #211 in the flow chart shown in FIG. 13. Such inadequate reliability may result from a pupil diameter not realistic for a human eye because of excessively few extracted boundary points between the pupil and the iris, or unrealistic positions of the pupil center and the Purkinje's images, for example a situation in which the pupil center is positioned lower in the Y-direction than the Purkinje's images despite that the eyeball is illuminated from below, a situation in which the pupil center and the Purkinje's images are mutually separated to the right and to the left, or a situation in which the distance of the Purkinje's images is extremely large even when the eyeball is pressed to the eyepiece lens 11, due to erroneous detection of the Purkinje's images. Said step #210 checks the precision of the sight line detection, because the sight line detecting algorithm without such reliability judgment will lead to an extremely deteriorated precision of the sight line detection. If a step #211 identifies that inadequate reliability has been found for the 1st time, a step #222 varies the charge accumulation time or the amplification characteristics as in the step #217. In case the step #221 identifies the inadequate reliability and the step #223 identifies that the inadequate reliability has been found for the 2nd time, the sequence proceeds to a step #224 for varying the activated IRED's as in the step #219. In either case the sequence returns to the step #204 to effect the sight line detection again. The step #222 is selected as the first countermeasure for the inadequate reliability because the detection of the pupil center is generally the cause of trouble. If a step #223 identifies that the inadequate reliability has been found for the third time, the sight line detection is regarded to have failed (#225), and there is executed, as in the case of the step #220, the distance measuring point auto selecting subroutine (#116).

If the step #210 identifies that the reliability is acceptable, then there is calculated the distance between the eyepiece lens 11 of the camera and the eyeball 15 of the photographer from the distance of the Purkinje's images, and also calculated is the imaging magnification β of the eyeball image projected onto the CCD-EYE, from said distance (#212). Based on these calculated values, the rotation angle θ of the optical axis of the eyeball 15 is calculated according to the equation (3) (#213).

Based on the rotation angles $\theta_x$, $\theta_y$ of the eyeball of the photographer, the coordinates of the line of sight on the focusing screen 7 are determined from the equation (5) (#214).

Figure 14:
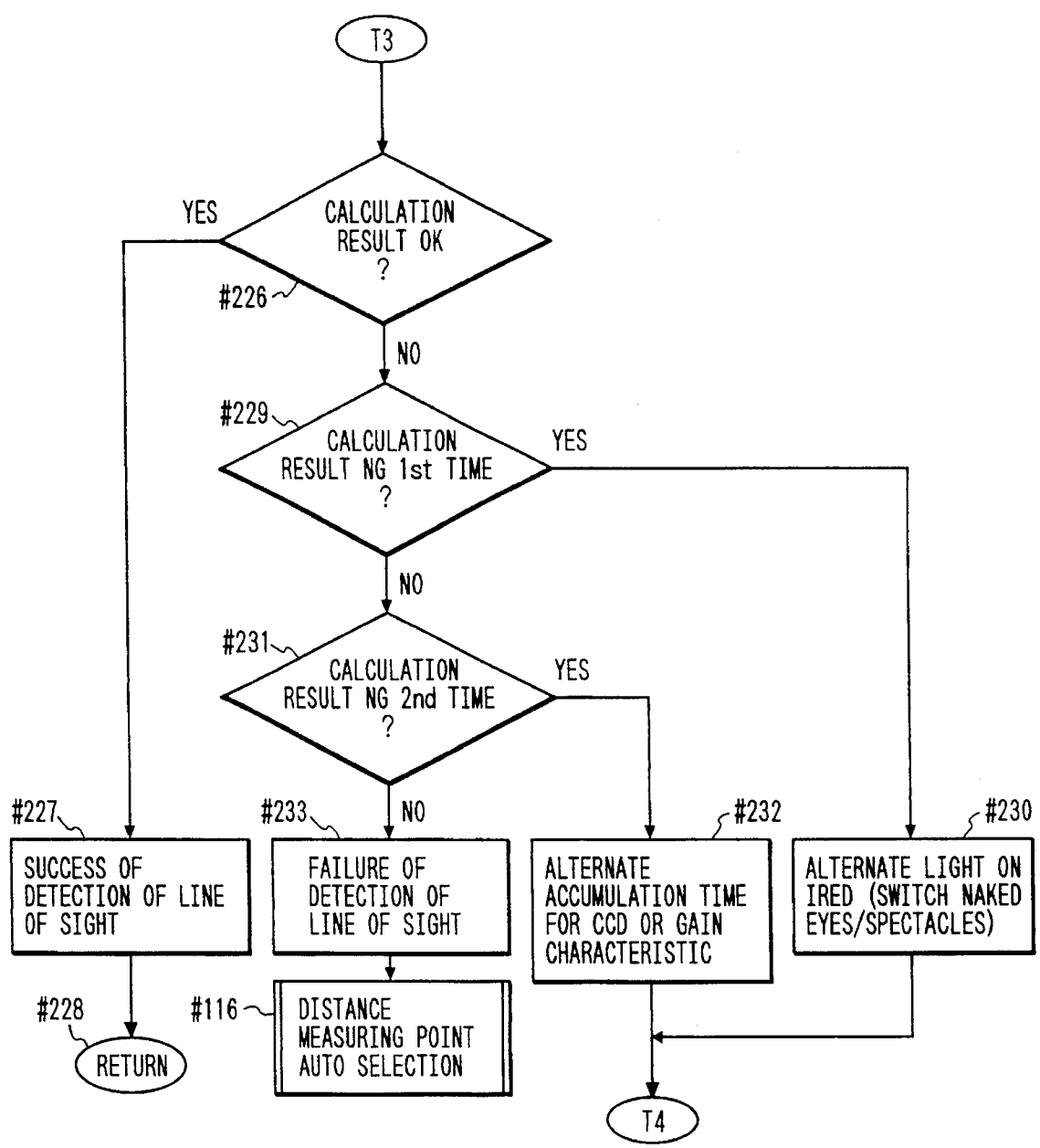

Now referring to the flow chart shown in FIG. 14, there is discriminated whether the calculated coordinates of the line of sight are proper (effective) (#226), by checking whether said coordinates are not abnormally large (plus direction) or small (minus direction) in the X- and Y-directions. As long as the photographer looks into the view finder, said coordinates are positioned within the viewing field of the finder or in the vicinity thereof. Particularly in case of selecting the distance measuring point for auto focusing as in the present embodiment, there can be selected threshold ranges of ±10 mm in the X-direction and ±3 mm in the Y-direction. The sight line detection is considered abnormal or ineffective if the result exceeds these threshold ranges. If the calculated results are proper, the sight line detection is regarded successful (#227), and the sight line detecting routine is terminated (#228).

If the calculated results are abnormal, and if the step #229 identifies that such abnormality has been found for the 1st time, the sequence proceeds to a step #230 for varying the activated IRED's (switching between the bare eye and the eye with eyeglass) as in the step #219. Then, if a step #231 identifies that the abnormality has been found for the 2nd time, the sequence proceeds to a step #232 for varying the charge accumulation time or the amplification characteristics. In either case, the sequence returns to the step #204 for effecting the sight line detection again. If the calculated results are still abnormal after repeated sight line detections following the steps #230 and #232, the sight line detection is regarded to have failed (#233), and there is executed the distance measuring point auto selecting algorithm (#116) as in the case of the step #220. The step #230 for varying the activated IRED's is selected as the first countermeasure for the improper calculated results, because such abnormal results are often derived from erroneous detection of the Purkinje's image based on the external light or the noise signals of the illumination device.

As explained in the foregoing, the rate of success of the sight line detection is improved by providing evaluation steps, namely the step #208 for discriminating whether the Purkinje's image and the pupil center have been detected, the step #210 for discriminating the reliability of the detection of the Purkinje's image and the pupil center, and the step #226 for judging whether the results calculated from the detected line of sight are proper, and by providing countermeasures for varying the output signal of the eyeball image by repeating the sight line detection in case the sight line detection is unsuccessful or improper in the precision.

Figure 15:
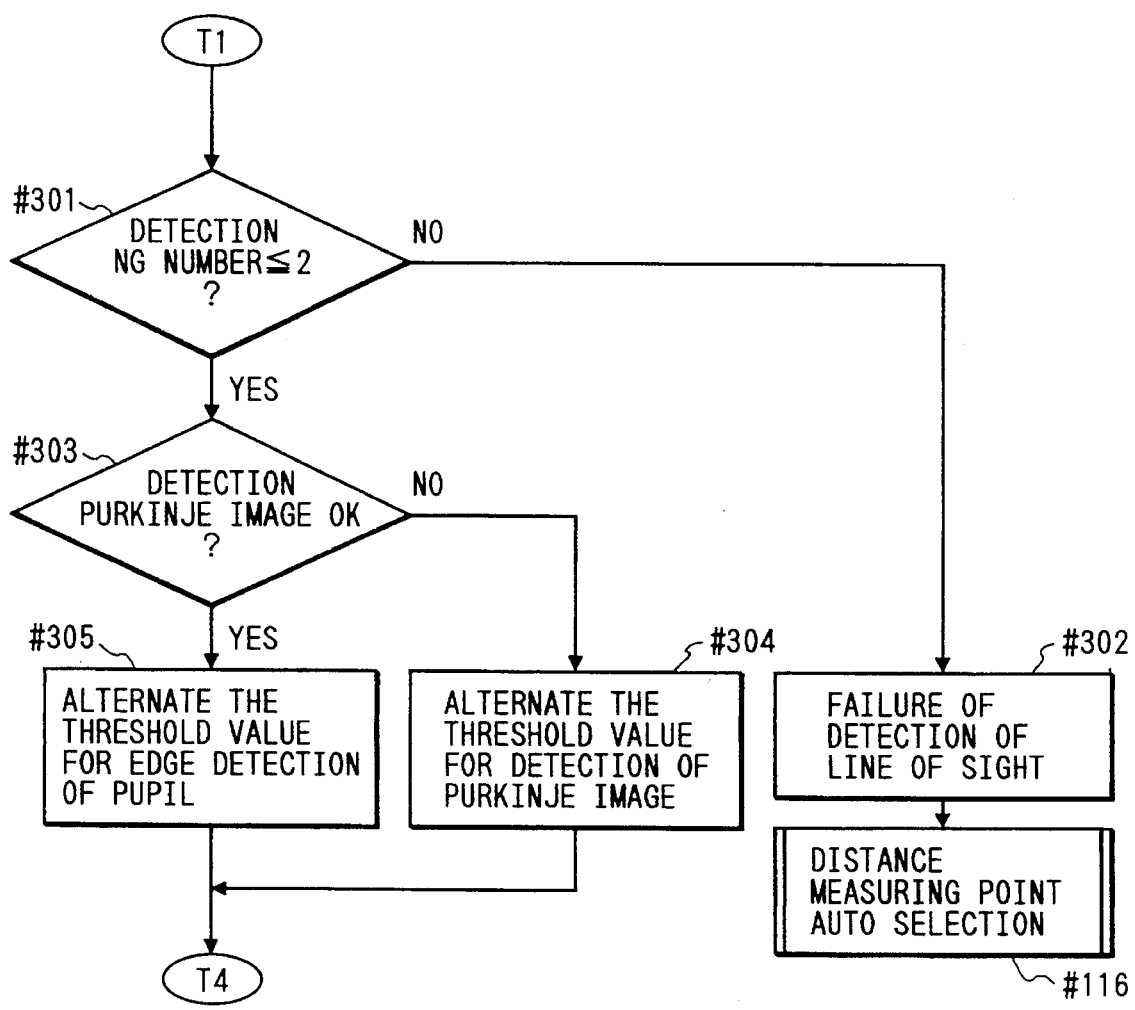
FIG. 15 is a flowchart in a second embodiment.

FIG. 15 is a flowchart of a 2nd embodiment of the present invention, showing the countermeasure in case the step #208 in FIG. 6 identifies that the detection has failed. If the failure of detection is for the 1st or 2nd time (#301), it is determined whether the failure is in the detection of the Purkinje's image (#303). If so, the sequence proceeds to a step #304 for varying the threshold value W for detecting the Purkinje's image, shown in FIG. 18B. It is effective to lower said threshold value W for the 1st time, and to elevate it when the step #304 is executed again after repeated failures. On the other hand, if the step #303 identifies that the Purkinje's image has been successfully detected, the failure is in the detection of the pupil center, and the sequence proceeds to a step #305 for varying the threshold value V for detecting the pupil edge (boundary between the pupil and the iris). Also in this case it is effective to lower the threshold value V for the 1st time, and to elevate it when the step #305 is repeated. After the step #304 or #305, the sequence returns to the step #204 to effect the sight line detection again.

If the detection of the Purkinje's image and the pupil center has failed three times, the detection of the line of sight is regarded to have failed (#302), as explained in the foregoing.

Figure 16:
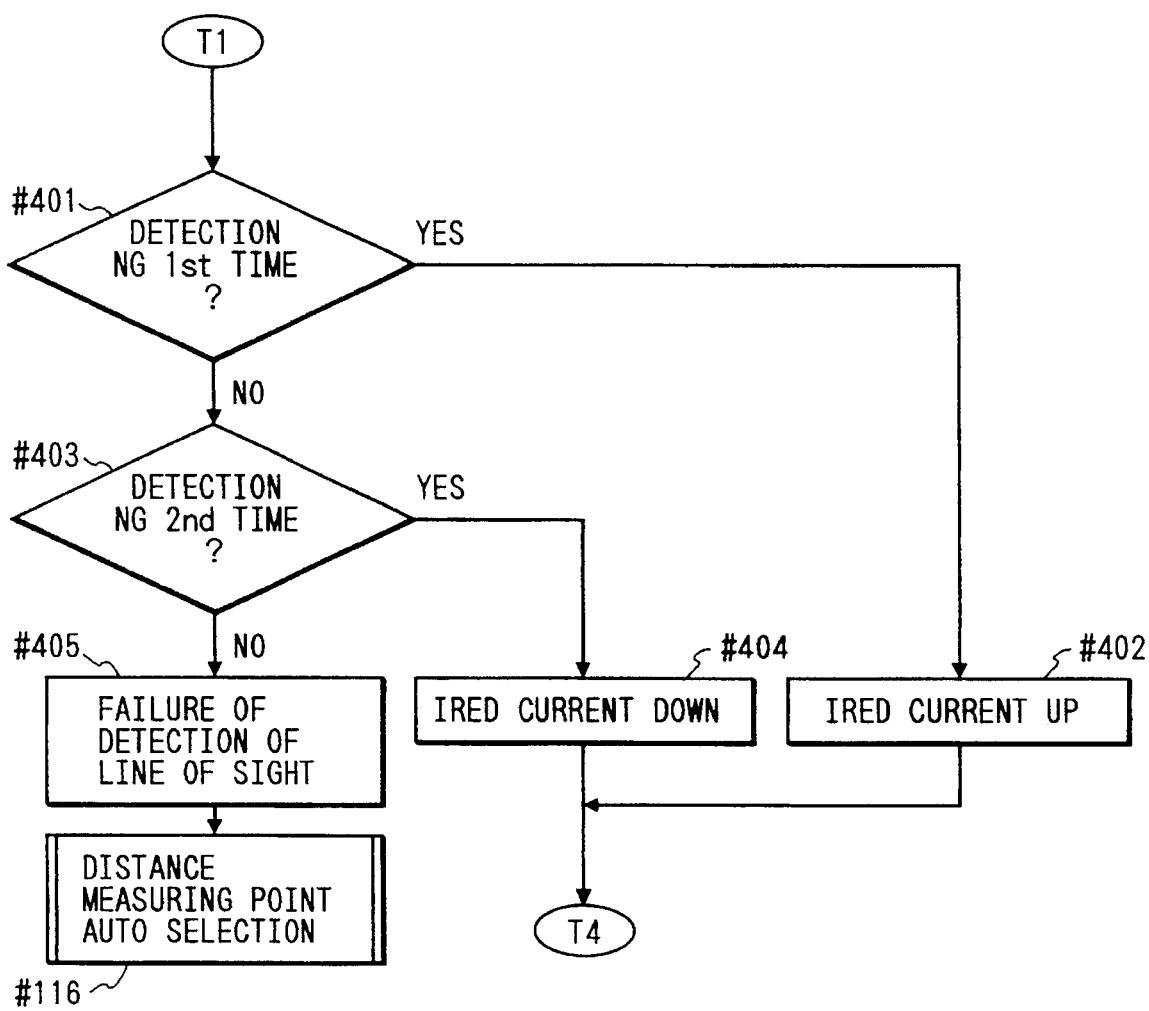
FIG. 16 is a flowchart in a third embodiment.
Figure 17:
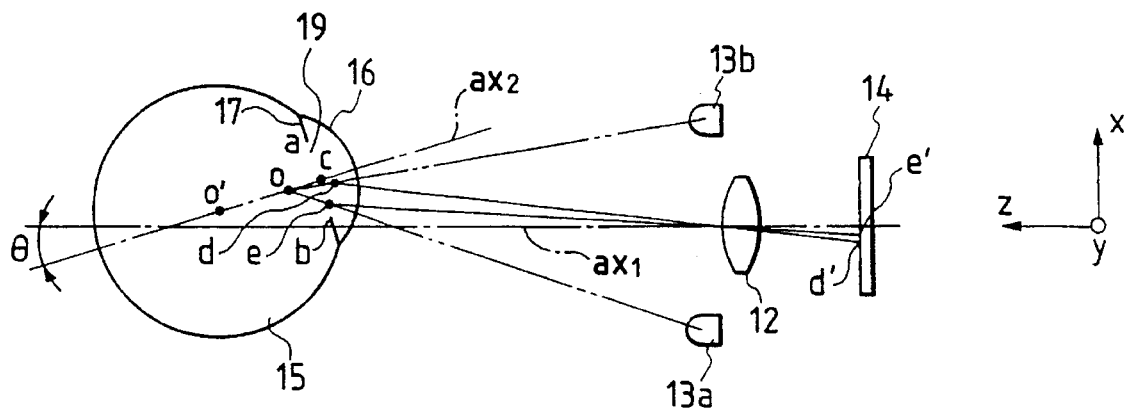
FIG. 17 is a view showing the principal of detection of the line of sight.

FIG. 16 is a flowchart of a 3rd embodiment of the present invention, also showing a countermeasure in case the step #208 in FIG. 6 identifies that the detection has failed. In case a step #401 identifies that the failure in detection is for the 1st time, a step #402 increases the IRED current to increase the intensity of illumination. If a step #403 identifies a failure for the 2nd time, a step #404 decreases the IRED current to darken the illumination. Said steps #402, #404 intend to effect the detection again, with a variation in the entire output signal level of the eyeball image. The step #402 is effective in case a bare eye is separated from the eye-piece lens more than the normal case, while the step #404 is effective in case an eye with the eyeglass generates a ghost image which is stronger than in the ordinary case. After said variation in the IRED current, the sequence returns to the step #204 to repeat the sight line detection. Also, when the failure in detection has been identified for the 3rd time, the detection of the line of sight is regarded to have failed, as explained in the foregoing.

Though the foregoing embodiments have been limited to the application to a single lens reflex camera, the present invention is likewise applicable to a camera with a lens shutter, a video camera, or observing or inspecting apparatus. Also the output indicating the direction of the line of sight can be utilized in various functional controls in a camera or other apparatus.

The sight line detecting device of the foregoing embodiment is provided with judgment means for judging whether the detection of the line of sight has been successful, and, in case said detection is identified to have failed, is adapted to execute the detection of the line of sight again after varying the image output signal of the reflected image of the eyeball or varying the detection threshold values for the feature points of said reflected image, thereby drastically improving the probability of success of the sight line detection. Thus such sight line detecting device can be utilized in equipment which is used indoors and outdoors and has a wide variety of users, such as a camera.

What is claimed is:

1. A device for detecting a line of sight, comprising:
   a) sight line detecting means for detecting the line of sight by processing of an eyeball image signal generated from an image of an eyeball of an observer;
   b) discrimination means for discriminating whether the detection by said sight line detecting means is proper; and
   c) control means for causing said sight line detecting means to again effect the detection of the line of sight by another processing of an eyeball image signal, in the event that said discrimination means identifies that the result of a previous detection is improper.

2. A device according to claim 1, wherein said sight line detecting means includes a photosensor circuit for receiving the eyeball image signal, and said control means causes to effect the detection of the line of sight again with a variation in the effective light-receiving time of said photosensor circuit.

3. A device according to claim 1, wherein said sight line detecting means includes a photosensor circuit for receiving the eyeball image signal, and said control means causes to effect the detection of the line of sight again with a variation in the output level of said photosensor circuit.

4. A device according to claim 2, wherein said photosensor circuit is composed of a signal accumulating photosensor circuit, and said control means causes to effect the detection of the line of sight again with a variation in the accumulating time of said signal accumulating photosensor circuit.

5. A device according to claim 3, wherein said control means causes to effect the detection of the line of sight again with a variation in the amplification gain of said photosensor circuit.

6. A device according to claim 1, wherein said sight line detecting means includes a photosensor circuit for receiving the eyeball image signal, and said control means causes to effect the detection of the line of sight again with a variation in the detection threshold value of the image signal output from said photosensor circuit.

7. A device according to claim 2, wherein said photosensor circuit is composed of a signal accumulating photosensor circuit, and said control means causes to effect the detection of the line of sight again with a variation in the detection threshold value of the image signal output from said signal accumulating photosensor circuit.

8. A device according to claim 1, wherein said sight line detecting means is adapted to detect a Purkinje's image as said eyeball image.

9. A device according to claim 1, wherein said sight line detecting means is adapted to detect a boundary of pupil and iris, as said the eyeball image.

10. A device according to claim 3, wherein said sight line detecting means is adapted to detect the Purkinje's image as the eyeball image.

11. A device according to claim 4, wherein said sight line detecting means is adapted to detect the Purkinje's image as the eyeball image.

12. A device according to claim 3, wherein said sight line detecting means is adapted to detect the boundary of pupil and iris as the eyeball image.

13. A device according to claim 4, wherein sight line detecting means is adapted to detect the boundary of pupil and iris as the eyeball image.

14. A device according to claim 1, further comprising:
   second control means for terminating the sight line detecting operation, if said discrimination means identifies that the result of detection is improper after the detections of the line of sight of a predetermined number executed by said control means.

15. A device according to claim 1, wherein said sight line detecting means includes illumination means for illuminating the eyeball of the observer, and light receiving means for detecting the reflected image of said eyeball, and is adapted to detect a Purkinje's image and the boundary of pupil and iris, by said eyeball image obtained from said light receiving means.

16. A device according to claim 15, wherein said illumination means is adapted to effect illumination from different directions by means at least of a pair of illuminating elements.

17. A device according to claim 16, wherein said illumination means is adapted to effect illumination by switching plural pairs of illuminating elements.

18. A device according to claim 1, further comprising:
   display means controlled according to the information on the line of sight obtained by said sight line detecting means.

19. A device according to claim 1, further comprising:
   electro-mechanical conversion means controlled according to the information on the line of sight obtained by said sight line detecting means.

20. A device according to claim 3, further comprising:
   display means controlled according to the information on the line of sight obtained by said sight line detecting means.

21. A device according to claim 3, further comprising:
   electro-mechanical conversion means controlled according to the information on the line of sight obtained by said sight line detecting means.

22. A device according to claim 4, further comprising:
   display means controlled according to the information on the line of sight obtained by said sight line detecting means.

23. A device according to claim 4, further comprising:
   electro-mechanical conversion means controlled according to the information on the line of sight obtained by said sight line detecting means.

24. A device for detecting a line of sight, comprising:
   a) sight line detecting means including illumination means for illuminating an eyeball of an observer by selecting a pair of illuminating elements from a plurality of pairs of illuminating elements, and light receiving means for detecting the reflected image of said eyeball, and adapted to detect the line of sight by the eyeball image obtained from said light receiving means;
   b) discrimination means for discriminating whether the detection by said sight line detecting means is proper; and
   c) control means for causing said sight line detecting means to effect the detection of the line of sight by another pair of illuminating elements of said illumination means, in the event that said discrimination means identifies that the result of a previous detection is improper.

25. A device according to claim 24, wherein the illuminating elements in each of said plural pairs in said illumination means are adapted to illuminate said eyeball from both sides thereof.

26. A device for detecting a line of sight, comprising:
   a) sight line detecting means including illumination means for illuminating an eyeball of an observer with diffuse light, and light receiving means for reflecting the detected image of said eyeball, and adapted to detect the line of sight by an eyeball image obtained from said light receiving means;

b) discrimination means for discriminating whether the detection by said sight line detecting means is proper; and c) control means for causing said sight line detecting means to again effect the detection of the line of sight with a variation in the illumination output of said illumination means, in the event that said discrimination means identifies that the result of a previous detection is improper.

27. A device according to claim 26, wherein said illumination means in said sight line detecting means includes plural illuminating elements, and said control means causes to effect the detection of the line of sight again with a variation in the illumination output of said illuminating elements.

28. A device according to claim 26, wherein said illumination means in said sight line detecting means includes paired illuminating elements, and said control means causes to effect the detection of the line of sight again with a variation in the illumination output of said illuminating elements.

29. A device according to claim 24, wherein said sight line detecting means is adapted to detect the Purkinje's image as the eyeball image.

30. A device according to claim 24, wherein said sight line detecting means is adapted to detect the boundary of pupil and iris as the eyeball image.

31. A device according to claim 26, wherein said sight line detecting means is adapted to detect the Purkinje's image as the eyeball image.

32. A device according to claim 26, wherein said sight line detecting means is adapted to detect the boundary of pupil and iris as the eyeball image.

33. A device according to claim 24, further comprising:

second control means for terminating the operation of detection of the line of sight, if said discrimination means identifies that the result of detection is improper even after the detections of the line of sight of a predetermined number by said control means.

34. A device according to claim 26, further comprising:

second control means for terminating the operation of detection of the line of sight, if said discrimination means identifies that the result of detection is improper even after the detections of the line of sight of a predetermined number by said control means.

35. A device according to claim 24, wherein said sight line detecting means is adapted to detect the Purkinje's image and the boundary of pupil and iris as the eyeball image.

36. A device according to claim 26, wherein said sight line detecting means is adapted to detect the Purkinje's image and the boundary of pupil and iris as the eyeball image.

37. A device according to claim 24, further comprising:

display means controlled according to the information on the line of sight obtained by said sight line detecting means.

38. A device according to claim 24, further comprising:

electro-mechanical conversion means controlled according to the information on the line of sight obtained by said sight line detecting means.

39. A device according to claim 26, further comprising:

display means controlled according to the information on the line of sight obtained by said sight line detecting means.

40. A device according to claim 26, further comprising:

electro-mechanical conversion means controlled according to the information on the line of sight obtained by said sight line detecting means.

41. A device for detecting a line of sight, comprising:

a) light receiving means for receiving an eyeball image of an observer;

b) sight line detecting means for detecting the line of sight by utilizing an output of said light receiving means;

c) discrimination means for discriminating whether the detection by said sight line detecting means is proper; and d) light receiving control means for changing a control of said light receiving means and for causing said sight line detecting means to again effect the detection of the line of sight, in the event that said discrimination means identifies that the result of detection is improper.

42. A device according to claim 41, wherein said light receiving control means causes said sight line detecting means to effect the detection of the line of sight again by changing an effective light receiving time of said light receiving means.

43. A device according to claim 41, wherein said light receiving control means causes said sight line detecting means to again effect the detection of the line of sight by changing an output level of said light receiving means.

44. A device according to claim 42, wherein a signal accumulating photosensor is utilized as said light receiving means, and said light receiving control means causes said sight line detecting means to again effect the detection of the line of sight with a variation in the accumulating time of said signal accumulating photosensor.

45. A device according to claim 41, wherein said light receiving control means causes said sight line detecting means to again effect the detection of the line of sight with a variation in the detection threshold value of an eyeball image signal output from said light receiving means.

46. A device for detecting a line of sight, comprising:

a) sight line detecting means for detecting the line of sight of an observer;

b) discrimination means for discriminating whether the detection by said sight line detecting means is proper;

c) counting means for counting a number of discriminations in which said discrimination means identifies that a result of the detection is improper;

d) first re-detection means for changing a detection operation by said sight line detecting means and for causing said sight line detecting means to again effect the detection of said line of sight when the number counted by said counting means is one; and e) second re-detection means for changing the detection operation by said sight line detecting means and further for causing said sight line detecting means to again effect the detection of said line of sight when the number counted by said counting means is two.

47. A device according to claim 46, wherein said sight line detecting means has light receiving means for receiving an eyeball image of an observer, said first re-detection means or said second re-detection means changes the light receiving operation by said light receiving means and causes said sight line detecting means to again effect the detection of said line of sight again.

48. A device according to claim 46, wherein said sight line detecting means has illuminating means for illuminating the eyeball of the observer, said first re-detection means or said second re-detection means changing an illuminating operation by said illuminating means and again causes said sight line detecting means to again effect the detection of said line of sight.

49. A device according to claim 46, wherein said sight line detecting means has light receiving means for receiving an eyeball image of an observer, said discrimination means discriminates whether the detection is proper based on a state of the eyeball image, which is received by said light receiving means.

50. A device according to claim 46, wherein said discrimination means discriminates whether the detection is proper based on whether sight line information obtained by said sight line detecting means is a predetermined state.

51. A device according to claim 47, wherein a change of the light receiving operation of said light receiving means causes said sight line detecting means to change an effective light receiving time of said light receiving means.

52. A device according to claim 48, wherein a change of the illuminating operation of said illuminating means causes said sight line detecting means to change an illuminating position of said illuminating means.

53. A device according to claim 48, wherein a change of the illuminating operation of said illuminating means causes said sight line detecting means to change an illuminating output of said illuminating means.

54. A device according to claim 47, wherein a change of the light receiving operation of said light receiving means causes said sight line detecting means to change an output level of said light receiving means.

55. A device according to claim 47, wherein a change of the light receiving operation of said light receiving means causes said sight line detecting means to change a detecting threshold level of an eyeball image signal output from said light receiving means.

56. A device for detecting a line of sight, comprising:
   a) illumination means for illuminating an eyeball of an observer to generate a characteristic image of the eyeball;
   b) light receiving means for receiving the image of the eyeball having the characteristic image;
   c) detecting means for detecting a line of sight of the observer based on the characteristic image;
   d) discrimination means for discriminating whether a detected position of the characteristic image in said light receiving means is proper; and
   e) modification means for modifying control of said illumination means in the event that said discrimination means identifies that the detected position of the characteristic image is improper.

57. A device according to claim 56, wherein
the characteristic image is a Purkinje image generated in the eyeball.

58. A device according to claim 56, wherein
the characteristic image is a pupil image of the eyeball.

59. A device according to claim 56, wherein
said illumination means illuminates the eyeball of the observer using a pair of illumination elements and generates two Purkinje images, and said discrimination means discriminates whether detected positions of the two Purkinje images are proper.

60. A device according to claim 59, wherein
said discrimination means discriminates that an interval distance of the detected positions of two Purkinje images is proper.

61. A device according to claim 56, further comprising:

control means for terminating the operation of detection of the line of sight, if said discrimination means identifies that the result of detection is improper even after the detections of the line of sight of a predetermined number of times.

62. A device according to claim 56, further comprising display means controlled according to the information on the line of sight obtained by said sight line detecting means.

63. A device according to claim 56, further comprising:

electro-mechanical conversion means controlled according to the information on the line of sight obtained by said sight line detecting means.

64. A device according to claim 56, wherein said illumination means is an illuminating element, said light receiving means is a light receiving element, said detecting means is a detection circuit, said discrimination means is a discrimination circuit, and said modification means is a modification circuit.

65. A device for detecting a line of sight, comprising:
   a) illumination means for illuminating an eyeball of an observer;
   b) light receiving means for receiving the image of the eyeball having a characteristic image;
   c) detecting means for detecting a line of sight of the observer based on the characteristic image;
   d) discrimination means for discriminating whether a detected size of the characteristic image in said light receiving means is proper; and
   e) modification means for modifying control of said illumination means in the event that said discrimination means identifies that the size of the characteristic image is improper.

66. A device according to claim 65, wherein the characteristic image is a pupil image of an eyeball.

67. A device according to claim 65, further comprising:

control means for terminating the operation of detection of the line of sight, if said discrimination means identifies that the result of detection is improper even after the detections of the line of sight of a predetermined number of times.

68. A device according to claim 65, further comprising display means controlled according to the information on the line of sight obtained by said sight line detecting means.

69. A device according to claim 65, further comprising:

electro-mechanical conversion means controlled according to the information on the line of sight obtained by said sight line detecting means.

70. A device according to claim 65, wherein said illumination means is an illuminating element, said light receiving means is a light receiving element, said detecting means is a detection circuit, said discrimination means is a discrimination circuit, and said modification means is a modification circuit.

71. A device for detecting a line of sight, comprising:
   a) sight line detecting means including illumination means for illuminating an eyeball of an observer, and light receiving means for receiving the image of the eyeball, and adapted to detect the line of sight from an eyeball image obtained from said light receiving means;
   b) discrimination means for discriminating whether the result of the line of sight detection is proper in accordance with whether or not the detection result of the line of sight is within a predetermined range; and c) control means for causing said sight line detecting means to again effect the detection of the line of sight with different control of said illumination means in the event that said discrimination means identifies that the result of a previous detection is improper.

72. A device according to claim 71, wherein said illumination means in said sight line detecting means includes plural illuminating elements, and said control means causes said sight line detecting means to effect the detection of the line of sight again with a variation in the illumination output of said illuminating elements.

73. A device according to claim 71, wherein said illumination means in said sight line detecting means includes paired illuminating elements, and said control means causes said sight line detecting means to effect the detection of the line of sight again with a variation in the illumination output of said illuminating elements.

74. A device according to claim 71, wherein said sight line detecting means is adapted to detect the Purkinje's image as the eyeball image.

75. A device according to claim 71, wherein said sight line detecting means is adapted to detect the boundary of a pupil and iris as the eyeball image.

76. A device according to claim 71, further comprising:

second control means for terminating the operation of detection of the line of sight, if said discrimination means identifies that the result of detection is improper even after the detections of the line of sight of a predetermined number of times.

77. A device according to claim 71, wherein said sight line detecting means is adapted to detect the Purkinje's image and the boundary of a pupil and iris as the eyeball image.

78. A device according to claim 71, further comprising display means controlled according to the information on the line of sight obtained by said sight line detecting means.

79. A device according to claim 71, further comprising:

electro-mechanical conversion means controlled according to the information on the line of sight obtained by said sight line detecting means.

80. A device according to claim 71, wherein said illumination means is an illuminating element, said light receiving means is a light receiving element, said detecting means is a detection circuit, said discrimination means is a discrimination circuit, and said control means is a control circuit.

81. A device for detecting a line of sight, comprising:

a) sight line detecting means including illumination means for illuminating an eyeball of an observer, and light receiving means for receiving the image of the eyeball having a pupil image and adapted to detect the line of sight using an eyeball image obtained from said light receiving means;

b) discrimination means for discriminating whether image information at least relating to the pupil image is proper; and c) control means for causing said sight line detecting means to again effect the detection of the line of sight with a variation in the illumination output of said illumination means in the event that said discrimination means identifies that the image information is improper.

82. A device according to claim 81, wherein said illumination means in said sight line detecting means includes plural illuminating elements, and said control means causes said sight line detecting means to effect the detection of the line of sight again with a variation in the illumination output of said illuminating elements.

83. A device according to claim 81, wherein said illumination means in said sight line detecting means includes paired illuminating elements, and said control means causes said sight line detecting means to effect the detection of the line of sight again with a variation in the illumination output of said illuminating elements.

84. A device according to claim 81 further comprising:

second control means for terminating the operation of detection of the line of sight, if said discrimination means identifies that the result of detection is improper even after the detections of the line of sight of a predetermined number of times.

85. A device according to claim 81, wherein said sight line detecting means is adapted to detect the Purkinje's image and the boundary of a pupil and iris as the eyeball image.

86. A device according to claim 81, further comprising display means controlled according to the information on the line of sight obtained by said sight line detecting means.

87. A device according to claim 81, further comprising:

electro-mechanical conversion means controlled according to the information on the line of sight obtained by said sight line detecting means.

88. A device according to claim 81, wherein said illumination means is an illuminating element, said light receiving means is a light receiving element, said detecting means is a detection circuit, said discrimination means is a discrimination circuit, and said control means is a control circuit.

89. A device according to claim 81, wherein said discrimination means discriminates whether the detected position of the pupil image is proper.

90. A device according to claim 81, wherein said discrimination means discriminates whether a detected size of the pupil image of the eyeball is proper.

91. A device according to claim 81, wherein said discrimination means discriminates whether the calculated result of the line of sight detection is within a predetermined range.

92. A device according to claim 81, wherein said sight line detecting means includes a detection circuit, said discrimination means is a discrimination circuit, and said control means is a control circuit.

93. A device according to claim 24, wherein said discrimination means discriminates whether the detected position of the characteristic image is proper.

94. A device according to claim 24, wherein said discrimination means discriminates whether a detected size of the characteristic image of the eyeball is proper.

95. A device according to claim 24, wherein said discrimination means discriminates whether the calculated result of the line of sight detection is within a predetermined range.

96. A device according to claim 24, wherein said sight line detecting means includes a detection circuit, said discrimination means is a discrimination circuit, and said control means is a control circuit.

97. A device according to claim 41, wherein said discrimination means discriminates whether the detected position of the characteristic image is proper.

98. A device according to claim 41, wherein said discrimination means discriminates whether a detected size of the characteristic image of the eyeball is proper.

99. A device according to claim 41, wherein said discrimination means discriminates whether the calculated circuit of the line of sight detection is within a predetermined range.

100. A device according to claim 41, wherein said light receiving means is a light receiving element, said sight line detecting means includes a sight line detecting circuit, said discrimination means is a discrimination circuit, and said light receiving control means is a light receiving control circuit.

101. A device according to claim 46, wherein said discrimination means discriminates whether the detected position of the characteristic image is proper.

102. A device according to claim 46, wherein said discrimination means discriminates whether a detected size of the characteristic image of the eyeball is proper.

103. A device according to claim 46, wherein said discrimination means discriminates whether a calculated result of the line of sight detection is within a predetermined range.

104. A device according to claim 46, wherein said sight line detecting means includes a sight line detecting circuit, said discrimination means is a discrimination circuit, said first re-detection means is a first re-detection circuit, and said second re-detection means is a second re-detection circuit.

105. A device according to claim 26, wherein said sight line detecting means includes a detection circuit, said discrimination means is a discrimination circuit, and said control means is a control circuit.

106. A device for detecting a line of sight, comprising:

a) illumination means for illuminating an eyeball of an observer to generate a characteristic image of the eyeball, wherein the characteristic image is an edge part of a pupil image of the eyeball;

b) light receiving means for receiving the image of the eyeball having the characteristic image;

c) detecting means for detecting a line of sight of the observer based on the characteristic image;

d) discrimination means for discriminating whether a detected position of the characteristic image in said light receiving means is proper; and e) modification means for modifying control of said illumination means in the event that said discrimination means identifies that the detected position of the characteristic image is improper.

\* \* \* \* \*

UNITED STATES PATENT AND TRADEMARK OFFICE
CERTIFICATE OF CORRECTION

PATENT NO. : 5,561,289
DATED : October 1, 1996
INVENTOR(S) : AKIRA YAMADA, ET AL.

It is certified that error appears in the above-indentified patent and that said Letters Patent is hereby corrected as shown below:

Title page,

<u>At [57] ABSTRACT</u>

Line 9, "achieve" should read --achieved--.

<u>Column 3</u>

Line 50, "identified not possible," should read --not possible to be identified,--.

<u>Column 6</u>

Line 67, "(#102)," should read --(#102).--

<u>Column 12</u>

Line 49, "is identified" should read --identified is--.

<u>Column 15</u>

Line 51, "said" should be deleted.

UNITED STATES PATENT AND TRADEMARK OFFICE
CERTIFICATE OF CORRECTION

PATENT NO. : 5,561,289
DATED : October 1, 1996
INVENTOR(S) : AKIRA YAMADA, ET AL.

It is certified that error appears in the above-indentified patent and that said Letters Patent is hereby corrected as shown below:

Column 19

Line 62, "Claim 59," should read --Claim 56,--.

Column 20

Line 6, "comprising" should read --comprising:--.
    Line 44, "comprising" should read --comprising:--.

Column 21

Line 35, "comprising" should read --comprising:--.

Column 22

Line 10, "Claim 81" should read --Claim 81,--.
    Line 19, "comprising" should read --comprising:--.

Signed and Sealed this

Third Day of June, 1997

Attest:

BRUCE LEHMAN

*Attesting Officer*      *Commissioner of Patents and Trademarks*